(12) United States Patent
Akgun et al.

(10) Patent No.: US 6,657,991 B1
(45) Date of Patent: Dec. 2, 2003

(54) METHOD AND SYSTEM FOR PROVISIONING NETWORK ADDRESSES IN A DATA-OVER-CABLE SYSTEM

(75) Inventors: Ali Akgun, Evanston, IL (US); John G. Fijolek, Naperville, IL (US); Steven W. Sangston, Bartlett, IL (US); Nurettin B. Beser, Evanston, IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/218,793

(22) Filed: Dec. 21, 1998

(51) Int. Cl.[7] .............................................. H04L 12/66
(52) U.S. Cl. ........................ 370/352; 370/389; 370/401; 375/222; 709/218
(58) Field of Search ................................. 370/352–356, 370/400, 401, 389, 386, 466, 467, 486–490; 375/222; 709/218

(56) References Cited

U.S. PATENT DOCUMENTS

| | | | |
|---|---|---|---|
| 4,644,533 A | 2/1987 | Braff et al. | 370/411 |
| 4,881,263 A | 11/1989 | Herbison et al. | 380/21 |
| 4,996,685 A | 2/1991 | Farese et al. | 370/352 |
| 5,014,234 A | 5/1991 | Edwards, Jr. | 713/200 |
| 5,138,712 A | 8/1992 | Corbin | 713/200 |
| 5,301,273 A | 4/1994 | Konishi | 709/245 |
| 5,430,727 A | 7/1995 | Callon | 370/401 |
| 5,442,749 A | 8/1995 | Northcutt et al. | 709/219 |
| 5,489,897 A | 2/1996 | Inoue | 340/870.39 |
| 5,598,410 A | 1/1997 | Stone | 370/469 |
| 5,610,910 A | 3/1997 | Focsaneanu et al. | 370/351 |
| 5,623,601 A | 4/1997 | Vu | 713/201 |
| 5,675,742 A | 10/1997 | Jain et al. | 709/226 |
| 5,678,041 A | 10/1997 | Baker et al. | 707/9 |
| 5,708,654 A | 1/1998 | Arndt et al. | 370/242 |
| 5,710,885 A | 1/1998 | Bondi | 709/224 |

(List continued on next page.)

OTHER PUBLICATIONS

"Radio Frequency Interface Specification (Interim Specification) SP–RFI–105–991105", MCNS Holdings, L.P., 1999, Pgs. ii to 202.

(List continued on next page.)

*Primary Examiner*—Hassan Kizou
*Assistant Examiner*—Saba Tsegaye
(74) *Attorney, Agent, or Firm*—McDonnell Boehnen Hulbert & Berghoff

(57) ABSTRACT

A method and system for provisioning network addresses in a data-over-cable system. Provisioning of network addresses allows multiple "always-on" network devices with multiple associated devices to be used on a data-over-cable system with a limited public network address pool. The "always-on" network devices provide services, such as, Voice over Internet Protocol ("VoIP"), that typically require instant access to data-over-cable system. Network devices such as "always-on" cable modems may allocated private network addresses (e.g., Internet Protocol addresses) on the data-over-cable system. The private network addresses are not addressable outside the data-over-cable system. Other network devices associated with the cable modems, such as customer premise equipment, may be allocated public network addresses (e.g., Internet Protocol Addresses) on the data-over-cable system. The public network addresses are addressable outside the data-over-cable system. The network address provisioning is accomplished by selecting a private network address marker and a public network address marker for selected network devices and using an extended Address Resolution Protocol table to determine a device type. The private network address marker or public network address marker is added to a Dynamic Host Configuration Protocol message field by a cable modem termination system. A Dynamic Host Configuration Protocol server uses the private or public address marker to allocate a private network address or a public network address on the data-over-cable system. The provisioning of network addresses allows two or more virtual networks to be created on the data-over-cable system, and may reduce a number of public network addresses required for a data-over-cable system.

44 Claims, 21 Drawing Sheets

U.S. PATENT DOCUMENTS

| | | | |
|---|---|---|---|
| 5,724,510 A | 3/1998 | Arndt et al. | 709/220 |
| 5,761,602 A | 6/1998 | Wagner et al. | 725/34 |
| 5,778,181 A | 7/1998 | Hidary et al. | 725/110 |
| 5,790,198 A | 8/1998 | Roop et al. | 348/460 |
| 5,790,548 A | 8/1998 | Sistanizadeh et al. | 370/401 |
| 5,790,677 A | 8/1998 | Fox et al. | 705/78 |
| 5,790,770 A | 8/1998 | McClure et al. | 709/231 |
| 5,790,806 A | 8/1998 | Koperda | 709/225 |
| 5,793,747 A | 8/1998 | Kline | 370/230 |
| 5,799,086 A | 8/1998 | Sudia | 705/76 |
| 5,805,804 A | 9/1998 | Laursen et al. | 709/223 |
| 5,809,252 A | 9/1998 | Beighe et al. | 709/227 |
| 5,812,819 A | 9/1998 | Rodwin et al. | 703/23 |
| 5,815,664 A | 9/1998 | Asano | 709/227 |
| 5,818,845 A | 10/1998 | Moura et al. | 370/449 |
| 5,819,028 A | 10/1998 | Manghirmalani et al. | 714/57 |
| 5,819,042 A | 10/1998 | Hansen | 714/756 |
| 5,828,655 A | 10/1998 | Moura et al. | 370/326 |
| 5,828,666 A | 10/1998 | Focsaneanu et al. | 370/389 |
| 5,835,720 A | 11/1998 | Nelson et al. | 709/224 |
| 5,835,727 A | 11/1998 | Wong et al. | 709/238 |
| 5,841,777 A | 11/1998 | Cohen | 370/433 |
| 5,848,233 A | 12/1998 | Radia et al. | 713/201 |
| 5,852,721 A | 12/1998 | Dillon et al. | 703/217 |
| 5,854,901 A | 12/1998 | Cole et al. | 709/245 |
| 5,859,852 A | 1/1999 | Moura et al. | 370/449 |
| 5,864,679 A | 1/1999 | Kanai et al. | 709/238 |
| 5,870,134 A | 2/1999 | Laubach et al. | 725/123 |
| 5,872,523 A | 2/1999 | Dellaverson et al. | 340/825.52 |
| 5,884,024 A | 3/1999 | Lim et al. | 713/201 |
| 5,892,754 A | 4/1999 | Kompella et al. | 370/236 |
| 5,894,479 A | 4/1999 | Mohammed | 370/401 |
| 5,903,558 A | 5/1999 | Jones et al. | 370/351 |
| 5,909,549 A | 6/1999 | Compliment et al. | 709/223 |
| 5,913,037 A | 6/1999 | Spofford et al. | 709/226 |
| 5,915,119 A | 6/1999 | Cone | 713/310 |
| 5,922,049 A | 7/1999 | Radia et al. | 709/220 |
| 5,922,051 A | 7/1999 | Sidey | 709/223 |
| 5,923,659 A | 7/1999 | Curry et al. | 370/401 |
| 5,926,458 A | 7/1999 | Yin | 370/230 |
| 5,943,604 A | 8/1999 | Chen et al. | 455/3.06 |
| 5,954,797 A | 9/1999 | Sidey | 709/223 |
| 5,958,007 A | 9/1999 | Lee et al. | 709/219 |
| 5,974,453 A | 10/1999 | Andersen et al. | 709/220 |
| 5,982,748 A | 11/1999 | Yin et al. | 370/232 |
| 5,987,524 A | 11/1999 | Yoshida et al. | 709/245 |
| 5,991,292 A | 11/1999 | Focsaneanu et al. | 370/352 |
| 5,991,306 A | 11/1999 | Burns et al. | 370/429 |
| 5,996,076 A | 11/1999 | Rowney et al. | 713/201 |
| 5,999,536 A | 12/1999 | Kawafuji et al. | 370/401 |
| 6,003,077 A | 12/1999 | Bawden et al. | 709/223 |
| 6,005,851 A | 12/1999 | Craddock et al. | 370/329 |
| 6,006,264 A | 12/1999 | Colby et al. | 709/226 |
| 6,009,103 A | 12/1999 | Woundy | 370/401 |
| 6,012,088 A | 1/2000 | Li et al. | 709/219 |
| 6,013,107 A | 1/2000 | Blackshear et al. | 703/229 |
| 6,014,545 A | 1/2000 | Wu et al. | 725/118 |
| 6,018,767 A | 1/2000 | Fijolek et al. | 709/218 |
| 6,031,841 A | 2/2000 | Woundy | 370/410 |
| 6,032,019 A | 2/2000 | Chen et al. | 455/5.1 |
| 6,041,041 A | 3/2000 | Ramanathan et al. | 370/241 |
| 6,046,979 A | 4/2000 | Bauman | 370/229 |
| 6,049,546 A | 4/2000 | Ramakrishnan | 370/412 |
| 6,049,825 A | 4/2000 | Yamamoto | 709/221 |
| 6,049,826 A | 4/2000 | Beser | 709/222 |
| 6,052,724 A | 4/2000 | Willie et al. | 709/223 |
| 6,058,421 A | 5/2000 | Fijolek et al. | 709/225 |
| 6,061,349 A | 5/2000 | Coile et al. | 370/389 |
| 6,065,049 A | 5/2000 | Beser | 709/218 |
| 6,070,187 A * | 5/2000 | Subramaniam et al. | 709/220 |
| 6,070,242 A | 5/2000 | Wong et al. | 713/201 |
| 6,070,246 A | 5/2000 | Beser | 713/201 |
| 6,073,178 A | 6/2000 | Wong et al. | 709/229 |
| 6,075,787 A | 6/2000 | Bobeck et al. | 370/395 |
| 6,091,709 A | 7/2000 | Harrison et al. | 370/235 |
| 6,094,431 A | 7/2000 | Yamato et al. | 370/395 |
| 6,104,700 A | 8/2000 | Haddock et al. | 370/235 |
| 6,112,258 A | 8/2000 | Miller et al. | 710/19 |
| 6,122,254 A | 8/2000 | Miller et al. | 370/235 |
| 6,128,298 A * | 10/2000 | Wootton et al. | 370/392 |
| 6,130,879 A | 10/2000 | Liu | 370/230 |
| 6,130,880 A | 10/2000 | Naudus et al. | 370/235 |
| 6,137,792 A | 10/2000 | Jonas et al. | 370/354 |
| 6,137,793 A | 10/2000 | Gorman et al. | 370/360 |
| 6,148,410 A | 11/2000 | Baskey et al. | 714/4 |
| 6,157,965 A | 12/2000 | Mohammed et al. | 710/8 |
| 6,170,061 B1 | 1/2001 | Beser | 713/201 |
| 6,178,455 B1 | 1/2001 | Schutte et al. | 709/228 |
| 6,185,624 B1 | 2/2001 | Fijolek et al. | 709/239 |
| 6,189,102 B1 | 2/2001 | Beser | 713/201 |
| 6,208,656 B1 | 3/2001 | Hrastar et al. | 370/401 |
| 6,212,563 B1 | 4/2001 | Beser | 709/227 |
| 6,216,171 B1 | 4/2001 | Isono et al. | 709/250 |
| 6,223,222 B1 | 4/2001 | Fijolek et al. | 709/227 |
| 6,240,464 B1 | 5/2001 | Fijolek et al. | 709/250 |
| 6,260,072 B1 | 7/2001 | Rodriguez-Moral | 709/241 |
| 6,269,099 B1 | 7/2001 | Borella et al. | 370/389 |
| 6,272,150 B1 | 8/2001 | Hrastar et al. | 370/486 |
| 6,275,853 B1 | 8/2001 | Beser et al. | 709/223 |
| 6,295,554 B1 | 9/2001 | Karadogan | 709/219 |
| 6,301,223 B1 * | 10/2001 | Hrastar et al. | 370/227 |
| 6,301,618 B1 * | 10/2001 | Sitaraman et al. | 709/219 |
| 6,308,328 B1 | 10/2001 | Bowcutt et al. | 725/111 |
| 6,331,987 B1 | 12/2001 | Beser | 370/486 |
| 6,332,163 B1 | 12/2001 | Bowman-Amuah | 709/231 |
| 6,337,858 B1 | 1/2002 | Petty et al. | 370/356 |
| 6,351,773 B1 | 2/2002 | Fijolek et al. | 709/228 |
| 6,370,147 B1 | 4/2002 | Beser | 370/401 |
| 6,442,158 B1 | 8/2002 | Beser | 370/352 |

OTHER PUBLICATIONS

"Radio Frequency Interface Specification (Interim Specification) SP–RFIv1.1–106–001215", MCNS Holdings, L.P., 2000, Pgs. ii to 432.

Kyees, P.J. et al., *ADSL: A New Twisted–Pair Access to the Information Highway*, IEEE Communications Magazine, vol. 33, Issue 4, Apr. 1995, pp. 52–60.

Huang, Yin–Hwa et al., *Design of an MPEG–Based Set–Top Box for Video on Demand Services*, Acoustics, Speech, and Signal Processing, 1995, ICASSP–95., 1995 International Conference, vol. 4, ISBN: 0–7803–2431–5, May 9–12, 1995, pp. 2655–2658.

"Radio Frequency Interface Specification (Interim Specification) SP–RFI–104–980724", MCNS Holdings, L.P., 1997, Pgs. ii to 196.

\* cited by examiner

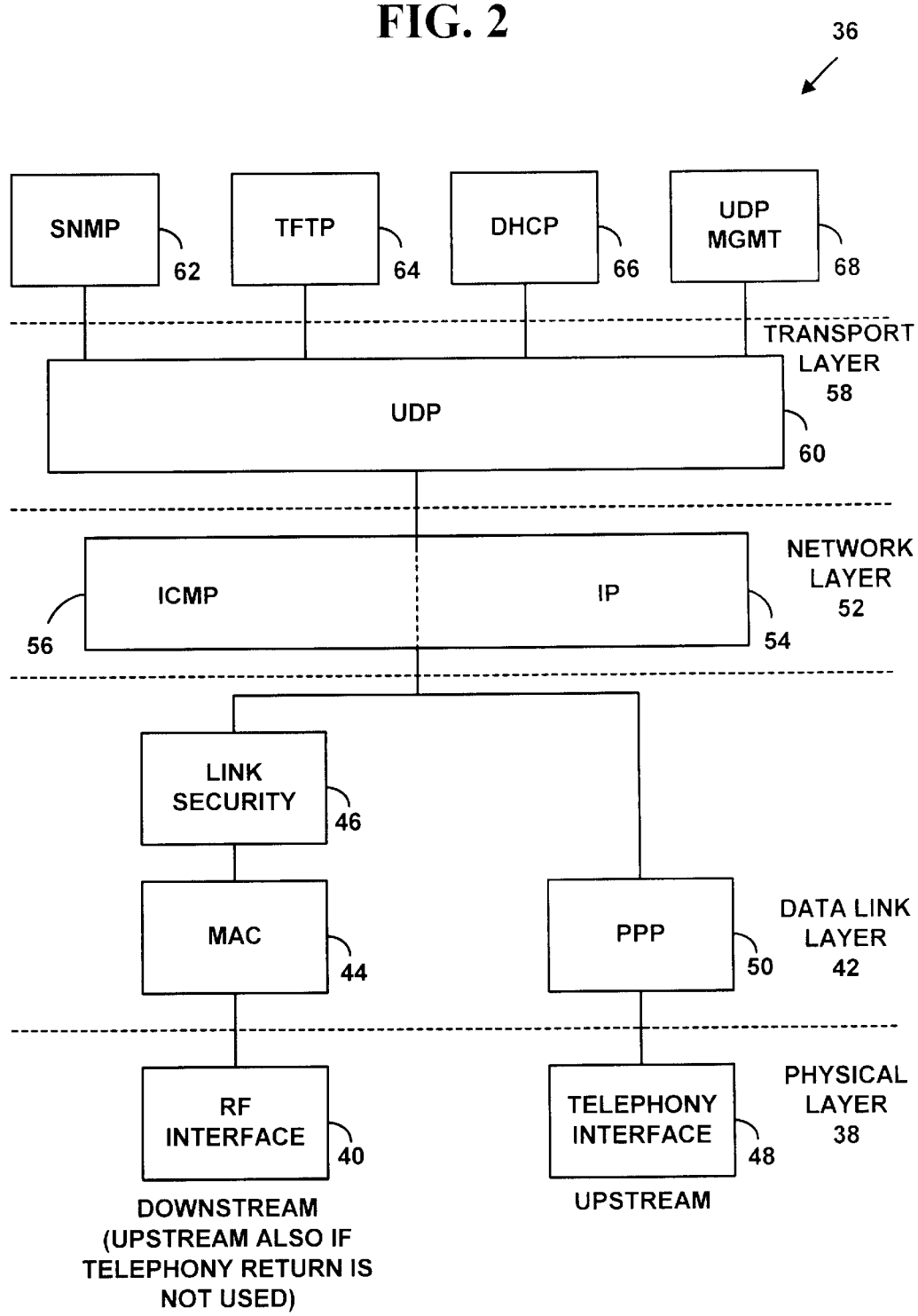

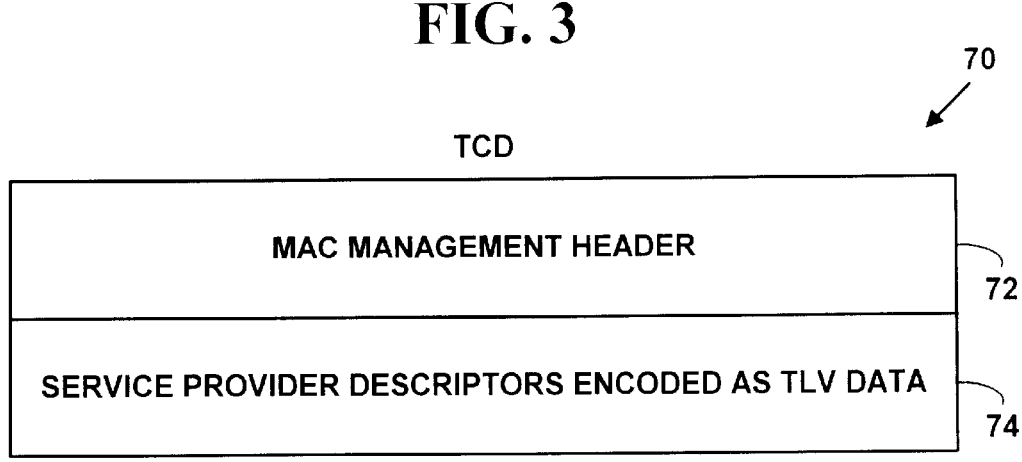
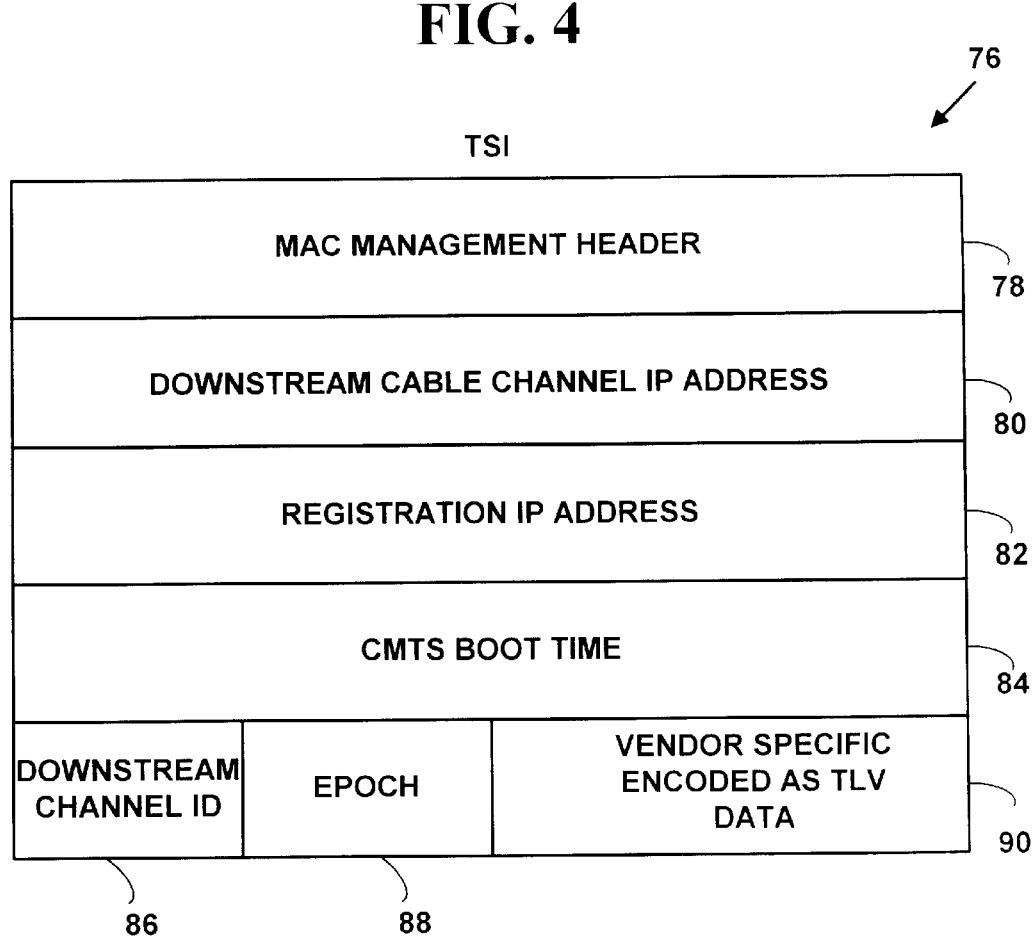

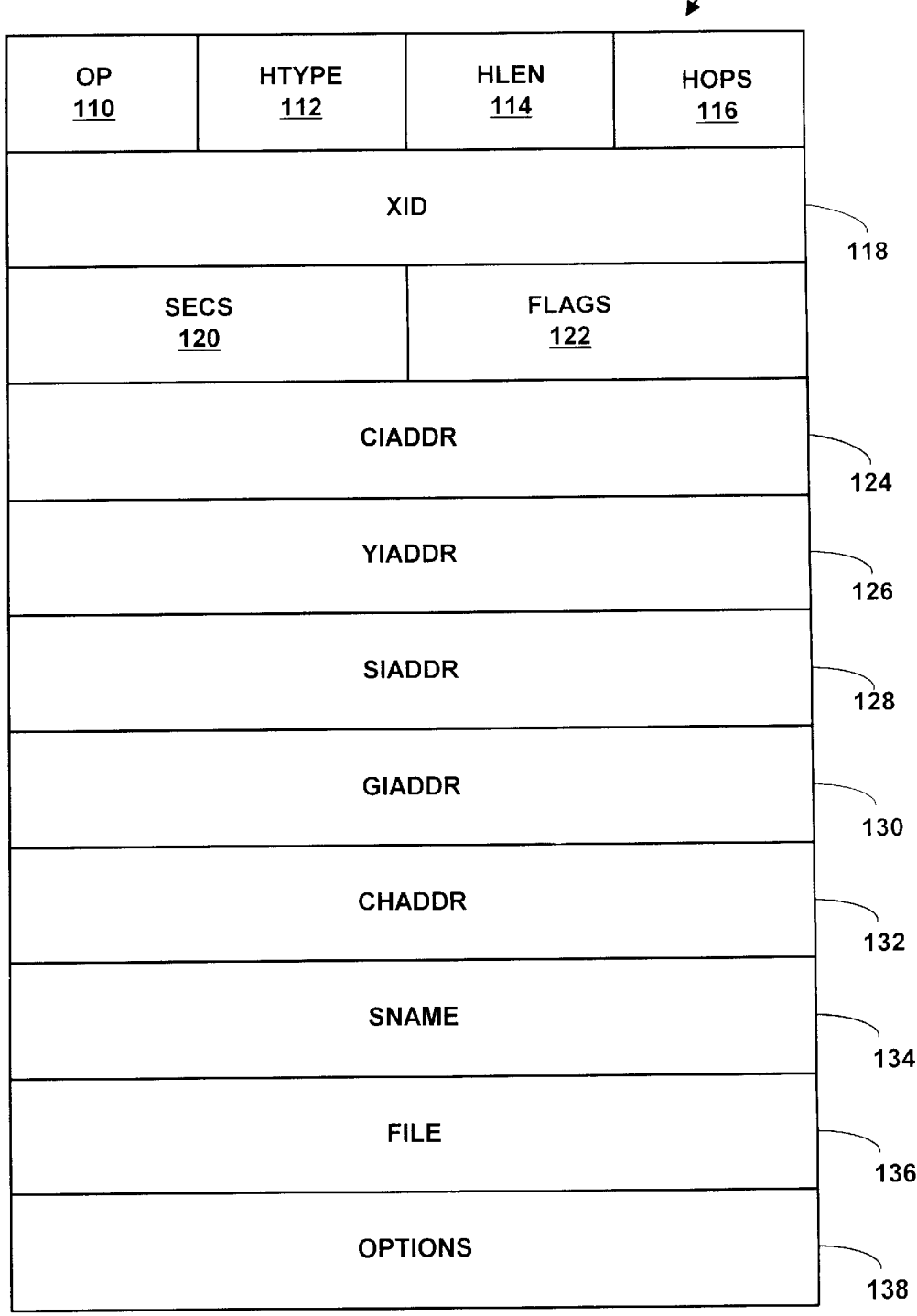

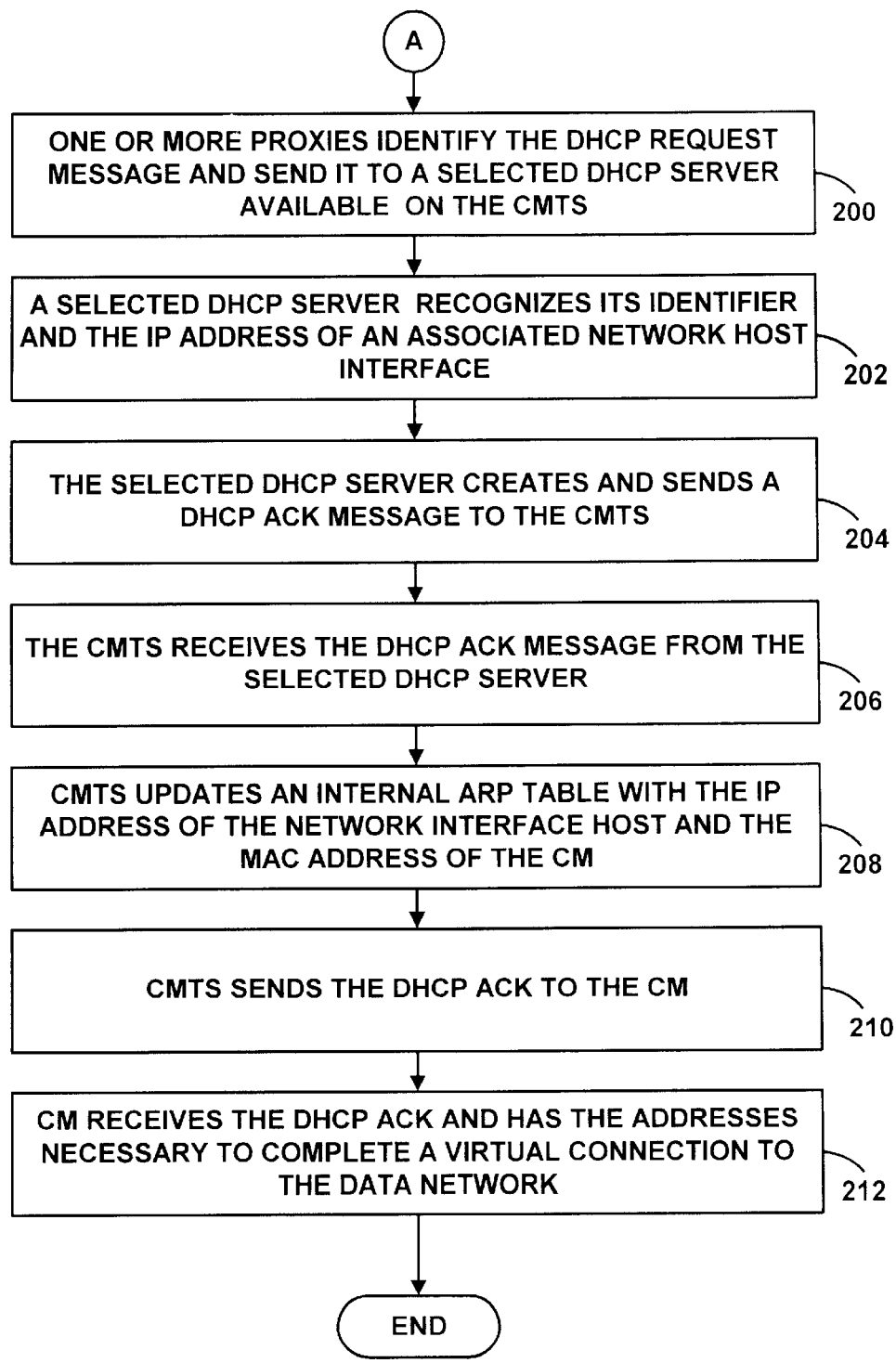

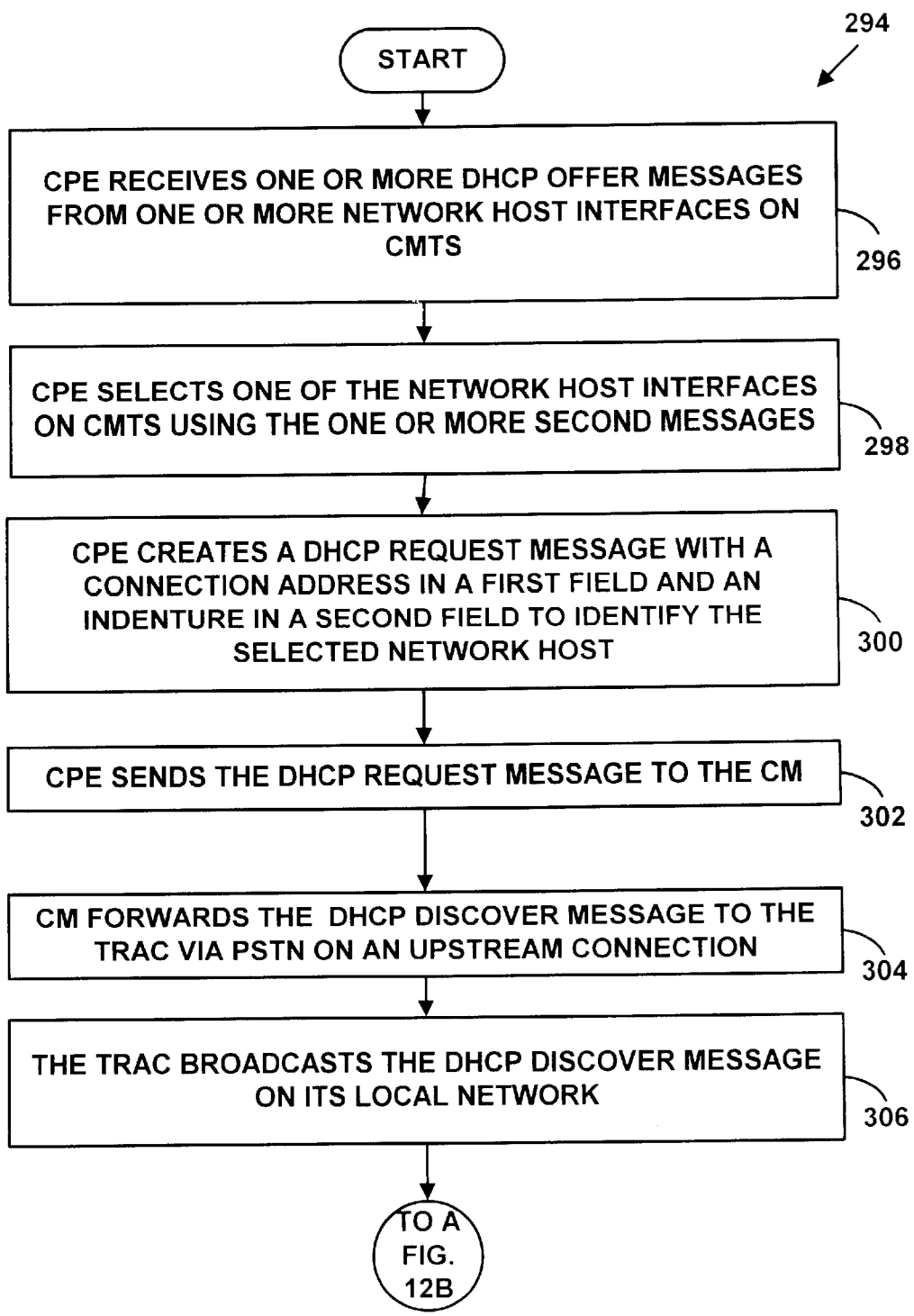

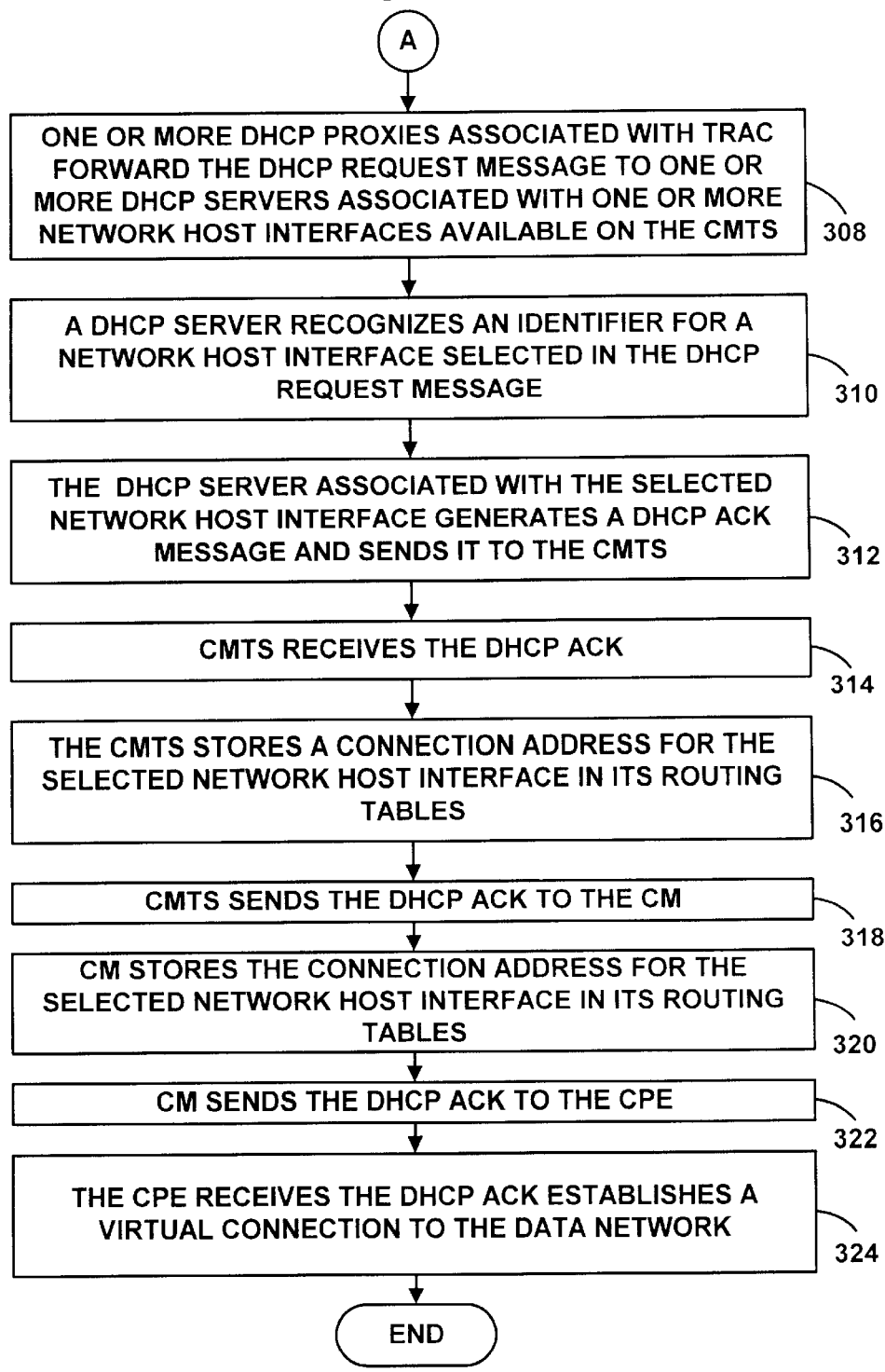

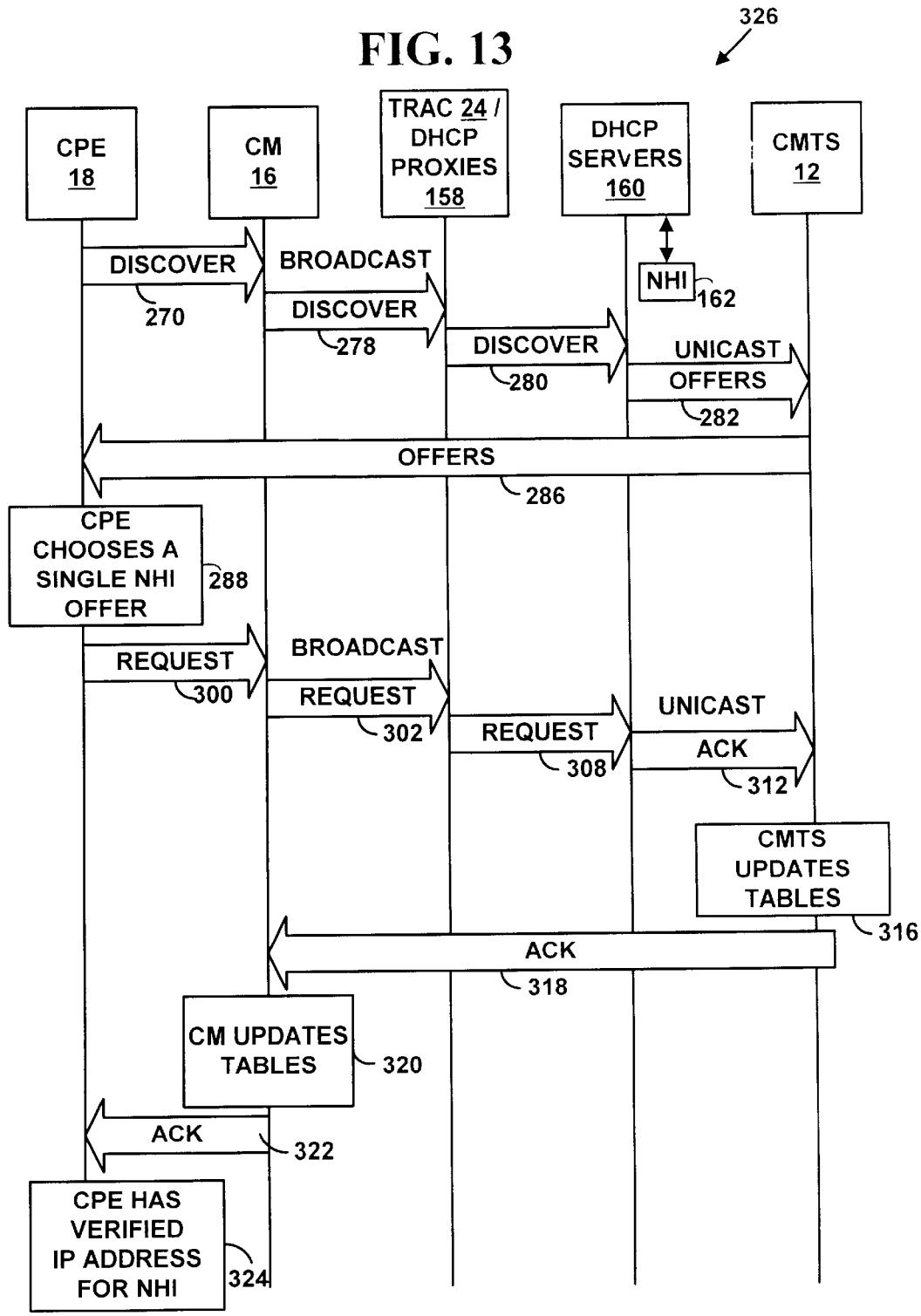

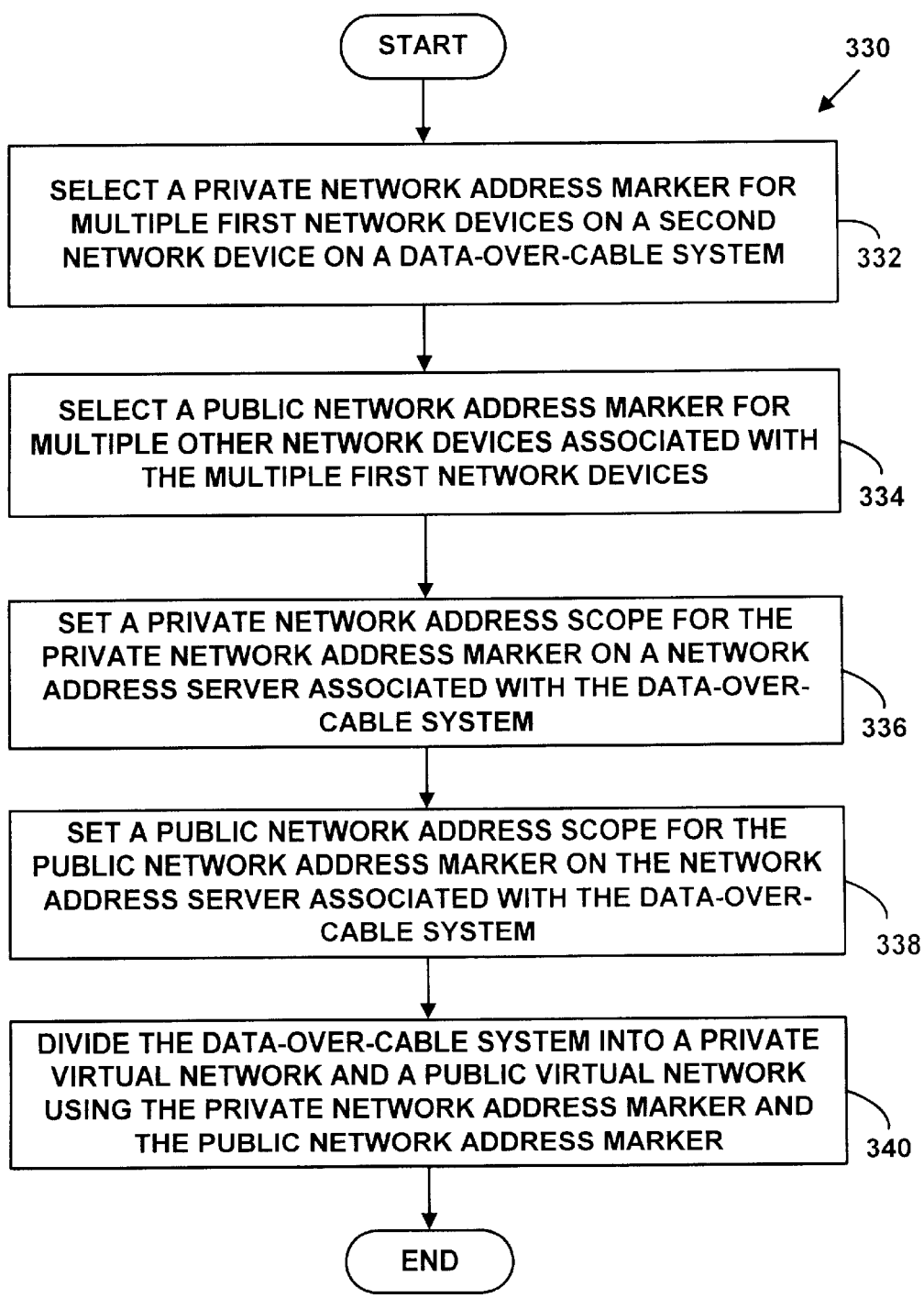

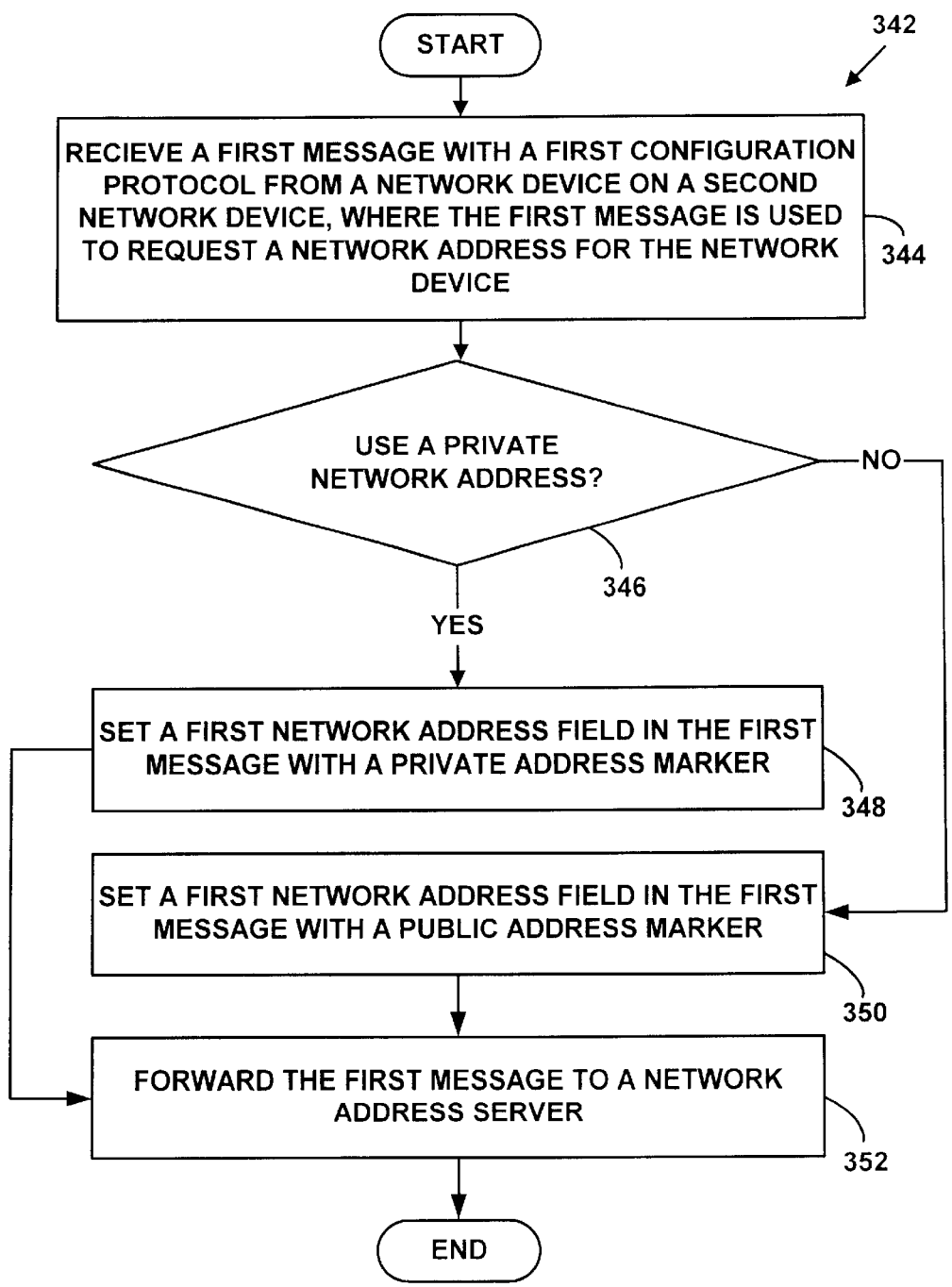

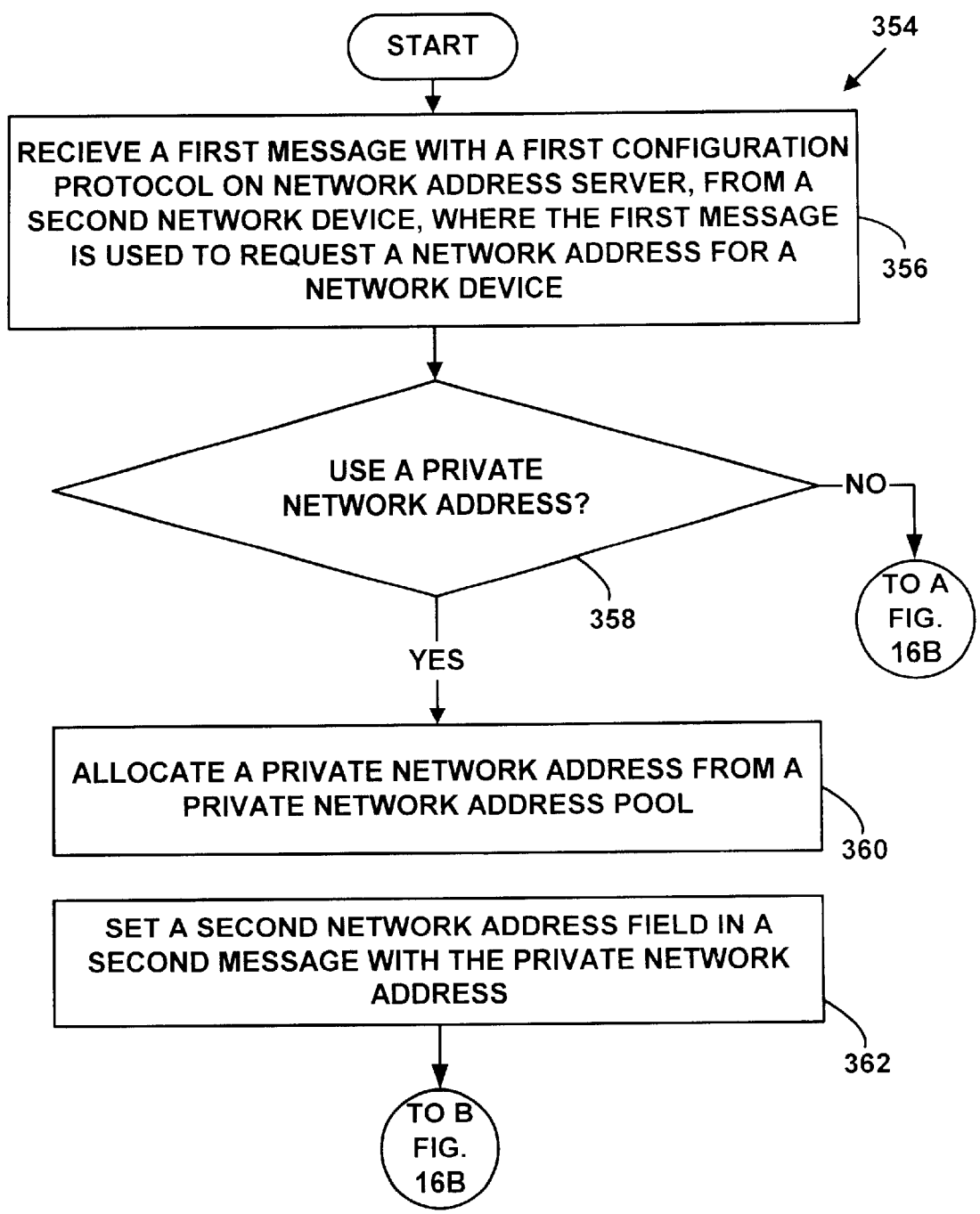

METHOD AND SYSTEM FOR PROVISIONING NETWORK ADDRESSES IN A DATA-OVER-CABLE SYSTEM

FIELD OF INVENTION

The present invention relates to communications in computer networks. More specifically, it relates to a method and system for provisioning network addresses in a data-over-cable system.

BACKGROUND OF THE INVENTION

Cable television networks such as those provided by Comcast Cable Communications, Inc., of Philadelphia, Pa., Cox Communications of Atlanta, Ga., Tele-Communications, Inc., of Englewood Colo., Time-Warner Cable, of Marietta Ga., Continental Cablevision, Inc., of Boston Mass., and others provide cable television services to a large number of subscribers over a large geographical area. The cable television networks typically are interconnected by cables such as coaxial cables or a Hybrid Fiber/Coaxial ("HFC") cable system which have data rates of about 10 Mega-bits-per-second ("Mbps") to about 30+ Mbps.

The Internet, a world-wide-network of interconnected computers, provides multi-media content including audio, video, graphics and text that typically requires a large bandwidth for downloading and viewing. Most Internet Service Providers ("ISPs") allow customers to connect to the Internet via a serial telephone line from a Public Switched Telephone Network ("PSTN") at data rates including 14,400 bps, 28,800 bps, 33,600 bps, 56,000 bps and others that are much slower than the about 10 Mbps to about 30+ Mbps available on a coaxial cable or HFC cable system on a cable television network.

With the explosive growth of the Internet, many customers have desired to use the larger bandwidth of a cable television network to connect to the Internet and other computer networks.

Cable modems, such as those provided by 3Com Corporation, of Santa Clara, Calif., Motorola Corporation, of Arlington Heights, Ill., Hewlett-Packard Co., of Palo Alto, Calif., Bay Networks, of Santa Clara, Calif., Scientific-Atlanta, of Norcross, Ga. and others offer customers higher-speed connectivity to the Internet, an intranet, Local Area Networks ("LANs") and other computer networks via cable television networks. These cable modems currently support a data connection to the Internet and other computer networks via a cable television network with a data rate of up to about 30+ Mbps, which is a much larger data rate than can be supported by a modem used over a serial telephone line.

However, many cable television networks provide only uni-directional cable systems, supporting only a "downstream" cable data path. A downstream data path is the flow of data from a cable system "headend" to a customer. A cable system headend is a central location in the cable television network that is responsible for sending cable signals in the downstream direction. A return data path via a telephone network (i.e., a "telephony return"), such as a public switched telephone network provided by AT&T, GTE, Sprint, MCI and others, is typically used for an "upstream" data path. An upstream data path is the flow of data from the customer back to the cable system headend. A cable television system with an upstream connection to a telephony network is called a "data-over-cable system with telephony return."

An exemplary data-over-cable system with telephony return includes customer premise equipment (e.g., a customer computer), a cable modem, a cable modem termination system, a cable television network, a public switched telephone network, a telephony remote access concentrator and a data network (e.g., the Internet). The cable modem termination system and the telephony remote access concentrator together are called a "telephony return termination system."

The cable modem termination system receives data packets from the data network and transmits them downstream via the cable television network to a cable modem attached to the customer premise equipment. The customer premise equipment sends response data packets to the cable modem, which sends response data packets upstream via public switched telephone network to the telephony remote access concentrator, which sends the response data packets back to the appropriate host on the data network.

In a two-way cable system without telephony return, the customer premise equipment sends response data packets to the cable modem, which sends the data packets upstream via the cable television network to the cable modem termination system. The cable modem termination system sends the data packets to appropriate hosts on the data network. The cable modem termination system sends the response data packets back to the appropriate cable modem.

As a cable modem is initialized in a data-over-cable system, it registers with a cable modem termination system to allow the cable modem to receive data over a cable television connection and from a data network (e.g., the Internet or an Intranet). The cable modem forwards configuration information it receives in a configuration file during initialization to the cable modem termination system as part of a registration request message. A cable modem also helps initialize and register any attached customer premise equipment with the cable modem termination system.

A cable modem termination system in a data-over-cable system typically manages connections to tens of thousands of cable modems. Most of the cable modems are attached to host customer premise equipment such as a customer computer. To send and receive data to and from a computer network like the Internet or an intranet, a cable modem and customer premise equipment and other network devices have a network address dynamically assigned on the data-over-cable system. Many data-over-cable systems use a Dynamic Host Configuration Protocol ("DHCP") as a standard messaging protocol to dynamically allocate network addresses such as Internet Protocol ("IP") addresses. As is known in the art, the Dynamic Host Configuration Protocol is a protocol for passing configuration information to network devices on a network. The Internet Protocol is an addressing protocol designed to route traffic within a network or between networks.

As was just described, many data-over-cable systems dynamically assign a network address, such as an Internet Protocol address, for a network device, such as a cable modem or customer premise equipment, with the Dynamic Host Configuration Protocol from a network address pool. When a cable modem or customer premise equipment is disconnected from the data-over-cable system, the dynamically assigned network addresses are returned to the network address pool for use by other network devices.

There are several problems associated with dynamically allocating network addresses to network devices. One problem is that certain types of cable modems are designed to be "always-on devices" with their own "permanent" Internet Protocol addresses (e.g., have an "indefinite" Internet Protocol lease time). The "always-on" cable modems are typically used for services such as Voice over Internet Protocol ("VoIP") that typically require instant access to a data-over-cable system. In effect, each "always-on" cable modem necessitates that a data-over-cable system reserve one network address, such as an Internet Protocol address, for each cable modem connected to the data-over-cable system, and at least one more network address for customer premise equipment or other network devices that are connected to the cable modems. This may severely deplete the available pool of network addresses and prevent cable modems that are not "always-on" from using the data-over-cable system.

Another problem is that for "always-on" cable modems, a data-over-cable system needs to maintain a pool of Internet Protocol addresses typically at least twice the number of cable modems connected to the data-over-cable system. In many instances, this number may be as high as three, four, five or more times the number of always-on cable modems since many always-on cable modems are typically connected to multiple network devices, which in turn require their own network addresses on the data-over-cable system. For example, one cable modem may service multiple customer devices (e.g., 5–10 customer computers) on a local area network. It is very expensive and may not even be possible to obtain and/or maintain such a large number of network addresses on a data-over-cable system to allow always-on and not always-on network devices to be used simultaneously.

Thus, it is desirable to allow a data-over-cable system to provide network addresses to network devices that are always-on and network devices that are not always-on, on the same data-over-cable system. The network addresses should be provided on the data-over-cable system without reserving a large number of network addresses for a desired number of always-on cable modems.

SUMMARY OF THE INVENTION

In accordance with preferred embodiments of the present inventions, some of the problems associated with allocating network addresses on a data-over-cable system for always-on network devices are overcome. A method and system for provisioning network addresses for a data-over-cable system is provided. One aspect of a preferred embodiment of the present invention includes a method for network address provisioning. The method includes selecting a private network address marker for multiple first network devices on a second network device on a data-over-cable system. The private network address marker indicates that a private network address is to be selected for the multiple first network devices. The private network address is not addressable outside of the data-over-cable system. A public network address marker is selected for multiple other network devices associated with the multiple first network devices. The public network address marker indicates that a public network address is to be selected for the multiple of other network devices. The public network address is addressable outside of the data-over-cable system. A private network address scope is set for the private address marker on a network address server associated with the data-over-cable system. A public network address scope is set for the public network address marker on the network address server associated with the data-over-cable system. The data-over-cable system is divided into a private virtual network and a public virtual network using the private network address marker and the public network address marker.

Another aspect of the present invention includes a method for using network address provisioning. The method includes receiving a first message with a first configuration protocol on a second network device from a network device to request a network address for the network device on the data-over-cable system. A test is conducted to determine whether the network device is to receive a private network address on the data-over-cable system with a network address table associated with the second network device. If the network device is to receive a private network address, a private network address marker is obtained on the second network device. The private network address marker indicates that a private network address is to be selected for network device. The private network address is not addressable outside of the data-over-cable system. A first network address field in the first message is set with the private network address marker.

If the network device is not to receive a private network address, a public network address marker is obtained on the second network device. The public network address marker indicates that a public network address is to be selected for network device. The public network address is addressable outside of the data-over-cable system. A first network address field in the first message is set with the public network address marker.

The first message, including either a private network address marker or a public network address marker in the first network address field, is forwarded to a network address server associated with the data-over-cable system. The first network address field of the first message is used by the network address server to allocate a private or public network address on the data-over-cable system for the network device. If the first network address field includes a private address marker, the network device is allocated a private network address from a private network address pool by the network address server. If the first network address field includes a public network address marker, the network device is allocated a public network address by from public network address pool the network address server.

Preferred embodiments of the present invention may allow a first network device such as a cable modem (e.g., an always-on cable modem), to receive a private network address, such as a private Internet Protocol address, on the data-over-cable system. Other network devices, such as customer premise equipment, associated with the first network device, receive public network addresses, such as Internet Protocol addresses, on the data-over-cable system. Thus, preferred embodiments of the present invention may reduce a number of public network addresses, such as public Internet Protocol addresses, required by the data-over-cable system and may allow the data-over-cable system to split into two or more virtual networks (e.g., a private virtual network and a public virtual network).

The foregoing and other features and advantages of a preferred embodiment of the present invention will be more readily apparent from the following detailed description, which proceeds with references to the accompanying drawings.

BRIEF DESCRIPTION OF THE DRAWINGS

Preferred embodiments of the present invention are described with reference to the following drawings, wherein:

FIG. 2 is a block diagram illustrating a protocol stack for a cable modem;

FIG. 3 is a block diagram illustrating a Telephony Channel Descriptor message structure;

FIG. 4 is a block diagram illustrating a Termination System Information message structure;

FIG. 5 is a block diagram illustrating a Dynamic Host Configuration Protocol message structure;

FIGS. 9A and 9B are a flow diagram illustrating a method for resolving discovered host addresses.

FIGS. 12A and 12B are a flow diagram illustrating a method for resolving network host interfaces from customer premise equipment;

FIG. 13 is a block diagram illustrating a message flow for the methods in FIGS. 15A, 11B, and 12A and 12B;

FIG. 14 is a flow diagram illustrating a method for network address provisioning in a data-over-cable system;

FIG. 15 is a flow diagram illustrating a method for using network address provisioning in a data-over-cable system;

FIGS. 16A and 16B are a flow diagram illustrating allocation of provisioned network addresses in a data-over-cable system.

DETAILED DESCRIPTION OF PREFERRED EMBODIMENTS

Exemplary Data-over-cable System

Figure 1:
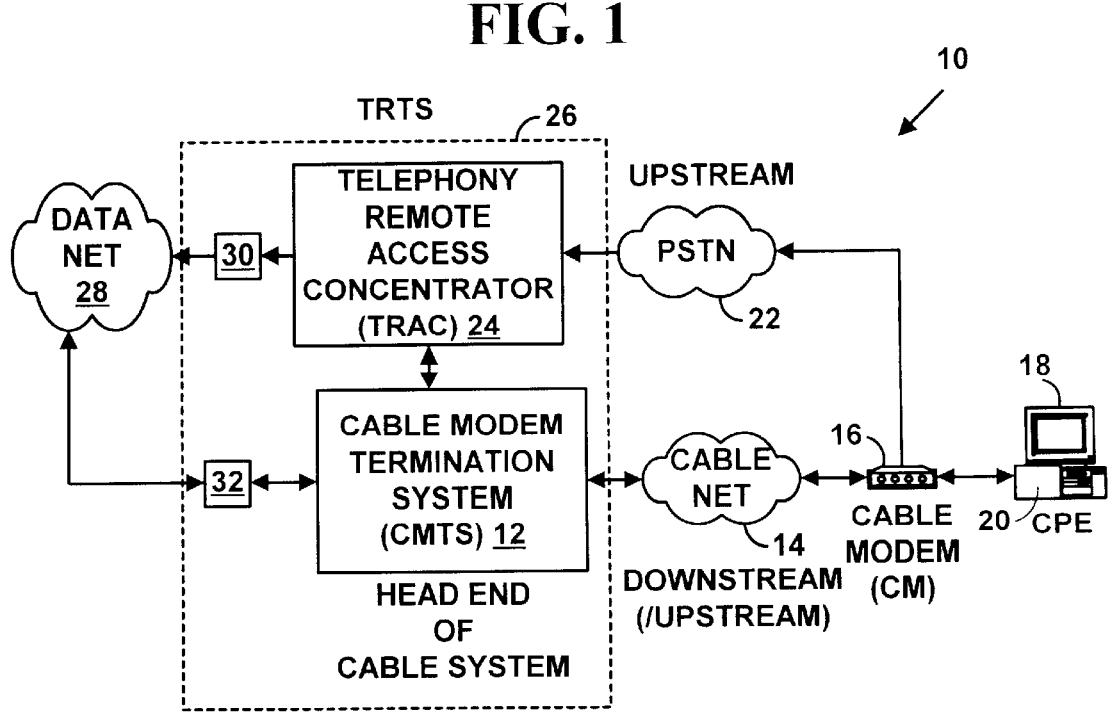
FIG. 1 is a block diagram illustrating a cable modem system with telephony return.

FIG. 1 is a block diagram illustrating an exemplary data-over-cable system 10. Most cable providers known in the art predominately provide uni-directional cable systems, supporting only a "downstream" data path. A downstream data path is the flow of data from a cable television network "headend" to customer premise equipment (e.g., a customer's personal computer). A cable television network headend is a central location that is responsible for sending cable signals in a downstream direction. A return path via a telephony network ("telephony return") is typically used for an "upstream" data path in uni-directional cable systems. An upstream data path is the flow of data from customer premise equipment back to the cable television network headend.

However, data-over-cable system 10 of the present invention may also provide a bi-directional data path (i.e., both downstream and upstream) without telephony return as is also illustrated in FIG. 1. The present invention is not limited to a data-over-cable system with telephony return. In a data-over cable system without telephony return, customer premise equipment or a cable modem has an upstream connection to the cable modem termination system via a cable television connection, a wireless connection, a satellite connection, or a connection via other technologies to send data upstream to the cable modem termination system.

Data-over-cable system 10 includes a Cable Modem Termination System ("CMTS") 12 connected to a cable television network 14, hereinafter cable network 14. FIG. 1 illustrates one CMTS 12. However, data-over-cable system 10 can include multiple CMTS 12. Cable network 14 includes cable television networks such as those provided by Comcast Cable Communications, Inc., of Philadelphia, Pa., Cox Communications, or Atlanta, Ga., Tele-Communications, Inc., of Englewood Colo., Time-Warner Cable, of Marietta, Ga., Continental Cablevision, Inc., of Boston, Mass., and others. The cable network 14 is connected to a Cable Modem ("CM") 16 with a downstream cable connection. The CM 16 is any cable modem such as those provided by 3Com Corporation of Santa Clara, Calif., Motorola Corporation of Arlington Heights, Ill., Hewlett-Packard Co. of Palo Alto, Calif., Bay Networks of Santa Clara, Calif., Scientific-Atlanta, of Norcross, Ga. and others. FIG. 1 illustrates one CM 16. However, in a typical data-over-cable system, tens or hundreds of thousands of the CMs 16 are connected to the CMTS 12. The CM 16 is connected to Customer Premise Equipment ("CPE") 18 such as a personal computer system via a Cable Modem-to-CPE Interface ("CMCI") 20.

One CPE 18 is illustrated in FIG. 1. However, the CM 16 may have multiple CPE 18 attached (Not illustrated in FIG. 1). In one preferred embodiment of the present invention, the CM 16 is connected to a Public Switched Telephone Network ("PSTN") 22 with an upstream telephony connection. The PSTN 22 includes those public switched telephone networks provided by AT&T, Regional Bell Operating Companies (e.g., Ameritech, U.S. West, Bell Atlantic, Southern Bell Communications, Bell South, NYNEX, and Pacific Telesis Group), GTE, Sprint, MCI and others. The upstream telephony connection is any of a standard telephone line connection, Integrated Services Digital Network ("ISDN") connection, Asymmetric Digital Subscriber Line ("ADSL") connection, or other telephony connection. The PSTN 22 is connected to a Telephony Remote Access Concentrator ("TRAC") 24.

In another preferred embodiment of the present invention, in a data-over cable system without telephony return, the CM 16 has an upstream connection to the CMTS 12 via a cable television connection, a wireless connection, a satellite connection, or a connection via other technologies to send data upstream outside of the telephony return path. An upstream cable television connection via cable network 14 is illustrated in FIG. 1.

FIG. 1 illustrates a telephony modem integral to the CM 16. In another embodiment of the present invention, the telephony modem is a separate modem unit external to the CM 16 used specifically for connecting with the PSTN 22. A separate telephony modem includes a connection to the CM 16 for exchanging data. In yet another embodiment of the present invention, the CM 16 includes functionality to connect only to the cable network 14 and receives downstream signals from the cable network 14 and sends upstream signals to the cable network 14 without telephony return. The present invention is not limited to cable modems used with telephony return.

In one preferred embodiment of the present invention of the telephony return, the TRAC 24 is a Total Control Telephony Hub by 3Com Corporation of Santa Clara, Calif. One exemplary TRAC 24 as a Total Control Telephony hub is described in U.S. Pat. No. 5,528,595, granted to Dale M. Walsh et al., and incorporated herein by reference. However, the TRAC 24 could also be a telephony hub including those by Lucent Technologies of Murray Hill, N.J., Livingston Enterprises, Inc. of Pleasanton, Calif., Ascend Communications of Alameda, Calif. and others.

The CMTS 12 and the TRAC 24 may be at a "headend" of cable system 10, or the TRAC 24 may be located elsewhere and have routing associations to the CMTS 12. The CMTS 12 and the TRAC 24 together are called a "Telephony Return Termination System" ("TRTS") 26. The TRTS 26 is illustrated by a dashed box in FIG. 1. The CMTS 12 and the TRAC 24 make up the TRTS 26 whether or not they are located at the headend of cable network 14. The TRAC 24 may be located in a different geographic location from the CMTS 12. Content severs, operations servers, administrative servers and maintenance servers used in data-over-cable system 10 (not shown in FIG. 1) may also be in different locations. Access points to the data-over-cable system 10 are connected to one or more of the CMTS 12, or cable headend access points. Such configurations may be "one-to-one", "one-to-many," or "many-to-many," and may be interconnected to other Local Area Networks ("LANs") or Wide Area Networks ("WANs").

The TRAC 24 is connected to a data network 28 (e.g., the Internet, an intranet or other LAN) by a TRAC-Network System Interface 30 ("TRAC-NSI"). The CMTS 12 is connected to data network 28 by a CMTS-Network System Interface ("CMTS-NSI") 32. The present invention is not limited to data-over-cable system 10 illustrated in FIG. 1, and more or fewer components, connections and interfaces could also be used. The present invention may also be used in a data-over-cable system 10 with, or without telephony return.

Network Device Protocol Stack

FIG. 2 is a block diagram illustrating a protocol stack 36 for network devices in data-over-cable system 10. FIG. 2 illustrates the downstream and upstream protocols used, for example, in the CM 16. As is known in the art, the Open System Interconnection ("OSI") model is used to describe computer networks. The OSI model consists of seven layers including from lowest-to-highest, a physical, data-link, network, transport, session, application and presentation layer. The physical layer transmits bits over a communication link. The data link layer transmits error free frames of data. The network layer transmits and routes data packets.

For downstream data transmission, network devices including the CM 16 are connected to cable network 14 in a physical layer 38 via a Radio Frequency ("RF") Interface 40. In a preferred embodiment of the present invention, RF Interface 40 has an operation frequency range of 50 Mega-Hertz ("MHz") to 1 Giga-Hertz ("GHz") and a channel bandwidth of 6 MHz. However, other operation frequencies may also be used and the invention is not limited to these frequencies. The RF interface 40 uses a signal modulation method, such as Quadrature Amplitude Modulation ("QAM"). As is known in the art, QAM is used as a means of encoding digital information over radio, wire, or fiber optic transmission links. QAM is a combination of amplitude and phase modulation and is an extension of multiphase phase-shift-keying. QAM can have any number of discrete digital levels typically including 4, 16, 64 or 256 levels. In one embodiment of the present invention, QAM-64 is used in the RF interface 40. However, other operating frequencies and modulation methods could also be used (e.g., Quadrature Phase Shift Keying ("QPSK") modulation). For more information on the RF interface 40 see the Institute of Electrical and Electronic Engineers ("IEEE") standard 802.14 for cable modems incorporated herein by reference. IEEE standards can be found on the World Wide Web at the Universal Resource Locator ("URL") "www.ieee.org." However, other RF interfaces 40 could also be used and the present invention is not limited to IEEE 802.14 (e.g., RF interfaces from Multimedia Cable Network Systems ("MCNS") and others could also be used).

Above the RF interface 40 in a data-link layer 42 is a Medium Access Control ("MAC") layer 44. As is known in the art, the MAC layer 44 controls access to a transmission medium via physical layer 38. For more information on the MAC layer protocol 44 see IEEE 802.14 for cable modems. However, other MAC layer protocols 44 could also be used and the present invention is not limited to IEEE 802.14 MAC layer protocols (e.g., MCNS MAC layer protocols and others could also be used).

Above the MAC layer 44 is an optional link security protocol stack 46. The link security protocol stack 46 prevents unauthorized users from making a data connection from cable network 14. The RF interface 40 and the MAC layer 44 can also be used for an upstream cable connection in a data-over-cable system 10 without telephony return.

For upstream data transmission with telephony return, the CM 16 is connected to the PSTN 22 in physical layer 38 via telephony interface 48. The International Telecommunications Union-Telecommunication Standardization Sector ("ITU-T", formerly known as the CCITT) defines standards for communication devices identified by "V.xx" series where "xx" is an identifying number. ITU-T standards can be found on the World Wide Web at the URL "www.itu.ch."

In one embodiment of the present invention, ITU-T V.34 is used as telephony interface 48. As is known in the art, ITU-T V.34 is commonly used in the data link layer for modem communications and currently allows data rates as high as 33,600 bits-per-second ("bps"). For more information see the ITU-T V.34 standard. However, modem interfaces (e.g., V.90) or other telephony interfaces could also be used. For example, an Asymmetric Digital Subscribe Link ("ADSL") or an Integrated Services Digital Network ("ISDN") telephony interface could also be used for the telephony interface 48.

Above the telephony interface 48, in the data link layer 42, is a Point-to-Point Protocol ("PPP") layer 50, hereinafter PPP 50. As is known in the art, PPP is used to encapsulate network layer datagrams over a serial communications link. For more information on PPP see Internet Engineering Task Force ("IETF") Request for Comments ("RFC"), RFC-1661, RFC-1662 and RFC-1663, incorporated herein by reference. Information for IETF RFCs can be found on the World Wide Web at URLs "ds.internic.net" or "www.ietf.org."

Above both the downstream and upstream protocol layers in a network layer 52 is an Internet Protocol ("IP") layer 54. IP layer 54, hereinafter IP 54, roughly corresponds to OSI layer 3, the network layer, but is typically not defined as part of the OSI model. As is known in the art, IP 54 is a routing protocol designed to route traffic within a network or between networks. For more information on IP 54 see, RFC-791, incorporated herein by reference.

Internet Control Message Protocol ("ICMP") layer 56 is used for network management. The main functions of ICMP layer 56, hereinafter ICMP 56, include error reporting, reachability testing (e.g., "pinging") congestion control, route-change notification, performance, subnet addressing and others. Since IP 54 is an unacknowledged protocol, datagrams may be discarded and ICMP 56 is used for error reporting. For more information on ICMP 56 see, RFC-971, incorporated herein by reference.

Above IP 54 and ICMP 56 is a transport layer 58 with a User Datagram Protocol layer 60 ("UDP"). UDP layer 60, hereinafter UDP 60, roughly corresponds to OSI layer 4, the transport layer, but is typically not defined as part of the OSI model. As is known in the art, UDP 60 provides a connectionless mode of communications with datagrams.

For more information on UDP 60 see, RFC-768, incorporated herein by reference. Transmission Control Protocol ("TCP") may also be used in the transport layer 58. For more information on TCP see, RFC-793, incorporated by reference.

Above the network layer are a Simple Network Management Protocol ("SNMP") layer 62, Trivial File Transfer Protocol ("TFTP") layer 64, Dynamic Host Configuration Protocol ("DHCP") layer 66 and a UDP manager 68. SNMP layer 62 is used to support network management functions. For more information on SNMP layer 62 see, RFC-1157, incorporated herein by reference. TFTP layer 64 is a file transfer protocol used to download files and configuration information. For more information on TFTP layer 64 see, RFC-1350, incorporated herein by reference. The DHCP layer 66 is a protocol for passing configuration information to hosts on an IP 54 network. For more information on the DHCP layer 66 see, RFC-1541, and RFC-2131, incorporated herein by reference. UDP manager 68 distinguishes and routes packets to an appropriate service (e.g., a virtual tunnel). More or few protocol layers could also be used with data-over-cable system 10.

The CM 16 supports transmission and reception of IP 54 datagrams as specified by RFC-791. The CMTS 12 and the TRAC 24 may also perform filtering of IP 54 datagrams. The CM 16 is also configurable for IP 54 datagram filtering to restrict the CM 16 and the CPE 18 to the use of only their assigned IP 54 addresses. The CM 16 is configurable for IP 54 datagram UDP 60 port filtering (i.e., deep filtering).

The CM 16 forwards IP 54 datagrams destined to an IP 54 unicast address across the cable network 14 or the PSTN 22. Some routers have security features intended to filter out invalid users who alter or masquerade packets as if sent from a valid user. Since routing policy is under the control of network operators, such filtering is a vendor specific implementation. For example, dedicated interfaces (i.e., Frame Relay) may exist between the TRAC 24 and/or the CMTS 12 which preclude filtering, or various forms of virtual tunneling and reverse virtual tunneling could be used to virtually source upstream packets from the CM 16. For more information on virtual tunneling, see Level 2 Tunneling Protocol ("L2TP") or Point-to-Point Tunneling Protocol ("PPTP") in IETF draft documents incorporated herein by reference by Kory Hamzeh, et. al (IETF draft documents are precursors to IETF RFCs and are works in progress).

The CM 16 also forwards IP 54 datagrams destined to an IP 54 multicast address across the cable network 14 or the PSTN 22. The CM 16 is configurable to keep IP 54 multicast routing tables and to use group membership protocols. The CM 16 is also capable of IP 54 tunneling upstream through the telephony path. A CM 16 that wants to send a multicast packet across a virtual tunnel will prepend another IP 54 header, set the destination address in the new header to be the unicast address of the CMTS 12 at the other end of the tunnel, and set the IP 54 protocol field to be four, which means the next protocol is IP 54.

The CMTS 12 at the other end of the virtual tunnel receives the packet, strips off the encapsulating IP 54 header, and forwards the packet as appropriate. A broadcast IP 54 capability is dependent upon the configuration of the direct linkage, if any, between the TRAC 24 and the CMTS 12. The CMTS 12, the CM 16, and the TRAC 24 are capable of routing IP 54 datagrams destined to an IP 54 broadcast address which is across the cable network 14 or the PSTN 22 if so configured. The CM 16 is configurable for IP 54 broadcast datagram filtering.

An operating environment for the CMTS 12, the CM 16 the CPE 18 and other network devices of the present invention includes a processing system with at least one high speed Central Processing Unit ("CPU") and a memory system. In accordance with the practices of persons skilled in the art of computer programming, the present invention is described below with reference to acts and symbolic representations of operations or instructions that are performed by the processing system, unless indicated otherwise. Such acts and operations or instructions are sometimes referred to as being "computer-executed", or "CPU executed."

It will be appreciated that the acts and symbolically represented operations or instructions include the manipulation of electrical signals by the CPU. An electrical system with data bits causes a resulting transformation or reduction of the electrical signal representation, and the maintenance of data bits at memory locations in the memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic disks, and any other volatile or non-volatile mass storage system readable by the CPU. The computer readable medium includes cooperating or interconnected computer readable media, which exist exclusively on the processing system or is distributed among multiple interconnected processing systems that may be local or remote to the processing system.

Initialization of a Cable Modem

When the CM 16 is initially powered on, if telephony return is being used, the CM 16 will receive a Telephony Channel Descriptor ("TCD") from the CMTS 12 that is used to provide dialing and access instructions on downstream channels via cable network 14. Information in the TCD is used by the CM 16 to connect to the TRAC 24. The TCD is transmitted as a MAC 44 management message with a management type value of TRI_TCD at a periodic interval (e.g., every 2 seconds). To provide for flexibility, the TCD message parameters are encoded in a Type/Length/Value ("TLV") form. However, other encoding techniques could also be used.

FIG. 3 is a block diagram illustrating a TCD message structure 70 with MAC 44 management header 72 and Service Provider Descriptor(s) ("SPD") 74 encoded in TLV format. SPDs 74 are compound TLV encodings that define telephony physical-layer characteristics that are used by the CM 16 to initiate a telephone call. The SPD 74 is a TLV-encoded data structure that contains sets of dialing and access parameters for the CM 16 with telephony return. The SPD 74 is contained within TCD message 70. There may be multiple SPD 74 encodings within a single TCD message 70. There is at least one SPD 74 in the TCD message 70. The SPD 74 parameters are encoded as SPD-TLV tuples. The SPD 74 contains the parameters shown in Table 1 and may contain optional vendor specific parameters. However, more or fewer parameters could also be used in the SPD 74.

TABLE 1

| SPD 74 Parameter | Description |
| --- | --- |
| Factory Default Flag | Boolean value, if TRUE(1), indicates a SPD which should be used by the CM 16. |
| Service Provider Name | This parameter includes the name of a service provider. Format is standard ASCII string composed of numbers and letters. |
| Telephone Numbers | These parameters contain telephone numbers that the CM 16 uses to initiate a telephony modem link during a login process. Connections are attempted in |

TABLE 1-continued

| SPD 74 Parameter | Description |
|---|---|
| | ascending numeric order (i.e., Phone Number 1, Phone Number 2 . . . ). The SPD contains a valid telephony dial string as the primary dial string (Phone Number 1), secondary dial-strings are optional. Format is ASCII string(s) composed of: any sequence of numbers, pound "#" and star "*" keys and comma character "," used to indicate a two second pause in dialing. |
| Connection Threshold | The number of sequential connection failures before indicating connection failure. A dial attempt that does not result in an answer and connection after no more than ten rings is considered a failure. The default value is one. |
| Login User Name | This contains a user name the CM 16 will use an authentication protocol over the telephone link during the initialization procedure. Format is a monolithic sequence of alphanumeric characters in an ASCII string composed of numbers and letters. |
| Login Password | This contains a password that the CM 16 will use during authentication over a telephone link during the initialization procedure. Format is a monolithic sequence of alphanumeric characters in an ASCII string composed of numbers and letters. |
| DHCP 66 Authenticate | Boolean value, reserved to indicate that the CM 16 uses a specific indicated DHCP 66 Server (see next parameter) for a DHCP 66 Client and BOOTP Relay Process when TRUE (one). The default is FALSE (zero) which allows any DHCP 66 Server. |
| DHCP 66 Server | IP 54 address value of a DHCP 66 Server the CM 16 uses for DHCP 66 Client and BOOTP Relay Process. If this attribute is present and DHCP 66 Authenticate attribute is TRUE(1). The default value is integer zero. |
| RADIUS Realm | The realm name is a string that defines a Remote Authentication Dial In User Service ("RADIUS") server domain. Format is a monolithic sequence of alphanumeric characters in an ACSII string composed of numbers and letters. |
| PPP 50 Authentication | This parameter instructs the telephone modem which authentication procedure to perform over the telephone link. |
| Demand Dial Timer | This parameter indicates time (in seconds) of inactive networking time that will be allowed to elapse before hanging up a telephone connection at CM 16. If this optional parameter is not present, or set to zero, then the demand dial feature is not activated. The default value is zero. |
| Vendor Specific Extensions | Optional vendor specific extensions. |

A Termination System Information ("TSI") message is transmitted by the CMTS 12 at periodic intervals (e.g., every 2 seconds) to report CMTS 12 information to the CM 16 whether or not telephony return is used. The TSI message is transmitted as a MAC 44 management message. The TSI provides a CMTS 12 boot record in a downstream channel to the CM 16 via cable network 14. Information in the TSI is used by the CM 16 to obtain information about the status of the CMTS 12. The TSI message has a MAC 44 management type value of TRI_TSI.

FIG. 4 is a block diagram of a TSI message structure 76. The TSI message structure 76 includes a MAC 44 management header 78, a downstream channel IP address 80, a registration IP address 82, a CMTS 12 boot time 84, a downstream channel identifier 86, an epoch time 88 and vendor specific TLV encoded data 90.

A description of the fields of TSI message 76 are shown in Table 2. However, more or fewer fields could also be used in TSI message 76.

TABLE 2

| TSI 76 Parameter | Description |
|---|---|
| Downstream Channel IP Address 80 | This field contains an IP 54 address of the CMTS 12 available on the downstream channel this message arrived on. |
| Registration IP Address 82 | This field contains an IP 54 address the CM 16 sends its registration request messages to. This address MAY be the same as the Downstream Channel IP 54 address. |
| CMTS Boot Time 84 | Specifies an absolute-time of a CMTS 12 recorded epoch. The clock setting for this epoch uses the current clock time with an unspecified accuracy. Time is represented as a 32 bit binary number. |
| Downstream Channel ID 86 | A downstream channel on which this message has been transmitted. This identifier is arbitrarily chosen by CMTS 12 and is unique within the MAC 44 layer. |
| Epoch 88 | An integer value that is incremented each time the CMTS 12 is either re-initialized or performs address or routing table flush. |
| Vendor Specific Extensions 90 | Optional vendor extensions may be added as TLV encoded data. |

If telephony return is being used, after receiving the TCD 70 message and the TSI message 76, the CM 16 continues to establish access to data network 28 (and resources on the network) by first dialing into the TRAC 24 and establishing a telephony PPP 50 session. Upon the completion of a successful PPP 50 connection, the CM 16 performs PPP 50 Link Control Protocol ("LCP") negotiation with the TRAC 24. Once LCP negotiation is complete, the CM 16 requests Internet Protocol Control Protocol ("IPCP") address negotiation for an upstream telephony return path. For more information on IPCP see, RFC-1332, incorporated herein by reference. During IPCP negotiation, the CM 16 negotiates an IP 54 address with the TRAC 24 for sending IP 54 data packet responses back to data network 28 via the TRAC 24, via PPP 50.

When the CM 16 has established an upstream IP 54 link to TRAC 24, it begins "upstream" communications to the CMTS 12 via the DHCP layer 66 to complete a virtual data connection by attempting to discover network host interfaces available on the CMTS 12 (e.g., IP 54 host interfaces for a virtual IP 54 connection). The virtual data connection allows the CM 16 to receive data from data network 28 via the CMTS 12 and cable network 14, and send return data to data network 28 via TRAC 24 and PSTN 22. The CM 16 must first determine an address of a host interface (e.g., an IP 54 interface) associated with on the CMTS 12 that can be used by data network 28 to send data to the CM 16. In one preferred embodiment of the present invention, the CM 16 has only a downstream cable connection from the CMTS 12 and will obtain a connection address to the data network 28 using an upstream telephony connection to the TRAC 24. In another preferred embodiment of the present invention, the CM 16 will obtain a connection address to the cable network using an upstream cable connection to the CMTS 12.

An exemplary data path through cable system 10 is illustrated in Table 3. However other data paths could also be used and the present invention is not limited to the data paths shown in Table 3. For example, the CM 16 may send data upstream back through the cable network 14 (e.g., the CM 16 to cable network 14 to the CMTS 12) and not use the PSTN 22, the TRAC 24, or the telephony return upstream path at all.

TABLE 3

1. An IP 54 datagram from data network 28 destined for the CM 16 arrives on the CMTS-NSI 32 enters the CMTS 12.
2. CMTS 12 encodes the IP 54 datagram in a cable data frame, passes it to MAC 44 and transmits it "downstream" to RF interface 40 on the CM 16 via cable network 14.
3. CM 16 recognizes the encoded IP 54 datagram in MAC layer 44 received via RF interface 40.
4. CM 16 responds to the cable data frame and encapsulates a response IP 54 datagram in a PPP 50 frame and transmits it "upstream" with telephony interface 48 via the PSTN 22 to TRAC 24.
5. TRAC 24 decodes the IP 54 datagram and forwards it via TRAC-NSI 30 to a destination on data network 28.

Dynamic Network Host Configuration on a Data-over-cable System

As was illustrated in FIG. 2, the CM 16 includes a Dynamic Host Configuration Protocol ("DHCP") layer 66, hereinafter the DHCP 66. The DHCP 66 is used to provide configuration parameters to hosts on a network (e.g., an IP 54 network). The DHCP 66 consists of two components: a protocol for delivering host-specific configuration parameters from a DHCP 66 server to a host and a mechanism for allocation of network host addresses to hosts. The DHCP 66 is built on a client-server model, where designated the DHCP 66 servers allocate network host addresses and deliver configuration parameters to dynamically configured network host clients.

FIG. 5 is a block diagram illustrating an exemplary DHCP 66 message structure 108. The format of the DHCP 66 messages is based on the format of BOOTstrap Protocol ("BOOTP") messages described in RFC-951 and RFC-1542, incorporated herein by reference. From a network host client's point of view, the DHCP 66 is an extension of the BOOTP mechanism. This behavior allows existing BOOTP clients to interpret with the DHCP 66 servers without requiring any change to network host the clients' BOOTP initialization software. The DHCP 66 provides persistent storage of network parameters for network host clients.

To capture BOOTP relay agent behavior described as part of the BOOTP specification and to allow interoperability of existing BOOTP clients with the DHCP 66 servers, the DHCP 66 servers uses a BOOTP message format. Using BOOTP relaying agents eliminates the necessity of having a DHCP 66 server on each physical network segment.

DHCP 66 message structure 108 includes an operation code field 110 ("op"), a hardware address type field 112 ("htype"), a hardware address length field 114 ("hlen"), a number of hops field 116 ("hops"), a transaction identifier field 118 ("xid"), a seconds elapsed time field 120 ("secs"), a flags field 122 ("flags"), a client IP address field 124 ("ciaddr"), a your IP address field 126 ("yiaddr"), a server IP address field 128 ("siaddr"), a gateway/relay agent IP address field 130 ("giaddr"), a client hardware address field 132 ("chaddr"), an optional server name field 134 ("sname"), a boot file name 136 ("file") and an optional parameters field 138 ("options"). Descriptions for an exemplary DHCP 66 message 108 fields are shown in Table 4.

TABLE 4

| DHCP 66 Parameter | Description |
| --- | --- |
| OP 110 | Message op code/message type. 1 BOOTREQUEST, 2 = BOOTREPLY. |
| HTYPE 112 | Hardware address type (e.g., '1' = 10 Mps Ethernet). |
| HLEN 114 | Hardware address length (e.g. '6' for 10 Mbps Ethernet). |
| HOPS 116 | Client sets to zero, optionally used by relay-agents when booting via a relay-agent. |
| XID 118 | Transaction ID, a random number chosen by the client, used by the client and server to associate messages and responses between a client and a server. |
| SECS 120 | Filled in by client, seconds elapsed since client started trying to boot. |
| FLAGS 122 | Flags including a BROADCAST bit. |
| CIADDR 124 | Client IP address; filled in by client in DHCPREQUEST if verifying previously allocated configuration parameters. |
| YIADDR 126 | 'Your' (client) IP address. |
| SIADDR 128 | IP 54 address of next server to use in bootstrap; returned in DHCPOFFER, DHCPACK and DHCPNAK by server. |
| GIADDR 130 | Gateway relay agent IP 54 address, used in booting via a relay-agent. |
| CHADDR 132 | Client hardware address (e.g., MAC layer 44 address). |
| SNAME 134 | Optional server host name, null terminated string. |
| FILE 136 | Boot file name, terminated by a null string. |
| OPTIONS 138 | Optional parameters. |

The DHCP 66 message structure shown in FIG. 5 is used to discover IP 54 and other network host interfaces in data-over-cable system 10. A network host client (e.g., the CM 16) uses the DHCP 66 to acquire or verify an IP 54 address and network parameters whenever the network parameters may have changed. Table 5 illustrates a typical use of the DHCP 66 protocol to discover a network host interface from a network host client.

TABLE 5

1. A network host client broadcasts a DHCP 66 discover message on its local physical subnet. The DHCP 66 discover message may include options that suggest values for a network host interface address. BOOTP relay agents may pass the message on to DHCP 66 servers not on the same physical subnet.
2. DHCP servers may respond with a DHCPOFFER message that includes an available network address in the 'yiaddr' field (and other configuration parameters in DHCP 66 options) from a network host interface. DHCP 66 servers unicasts the DHCPOFFER message to the network host client (using the DHCP/BOOTP relay agent if necessary) if possible, or may broadcast the message to a broadcast address (preferably 255.255.255.255) on the client's subnet.
3. The network host client receives one or more DHCPOFFER messages from one or more DHCP 66 servers. The network host client may choose to wait for multiple responses.
4. The network host client chooses one DHCP 66 server with an associated network host interface from which to request configuration parameters, based on the configuration parameters offered in the DHCPOFFER messages.

Discovering network host interfaces in the data-over-cable system

The DHCP 66 discovery process illustrated in Table 5 will not work in data-over-cable system 10 with or without telephony return. In an exemplary preferred embodiment of the present invention with telephony return, the CM 16 discovers network host interfaces via TRAC 24 and the PSTN 22. on an upstream telephony connection. In another exemplary preferred embodiment of the present invention without telephony return, the CM 16 discovers network host interfaces via the CMTS 12 on an upstream cable connection.

The DHCP 66 addressing process shown in Table 5 was not originally intended to discover network host interfaces for a system like the data-over-cable system 10. The CMTS 12 has DHCP 66 servers associated with network host interfaces (e.g., IP 54 interfaces). However, in one preferred embodiment of the present invention with telephony return, the CM 16 only has as downstream connection from the CMTS 12. The CM 16 has an upstream connection to TRAC 24, which has a DHCP 66 layer. However, TRAC 24 does not have the DHCP 66 servers, or direct access to network host interfaces (e.g., IP 54 interfaces) associated with the CMTS 12.

Figure 6A:
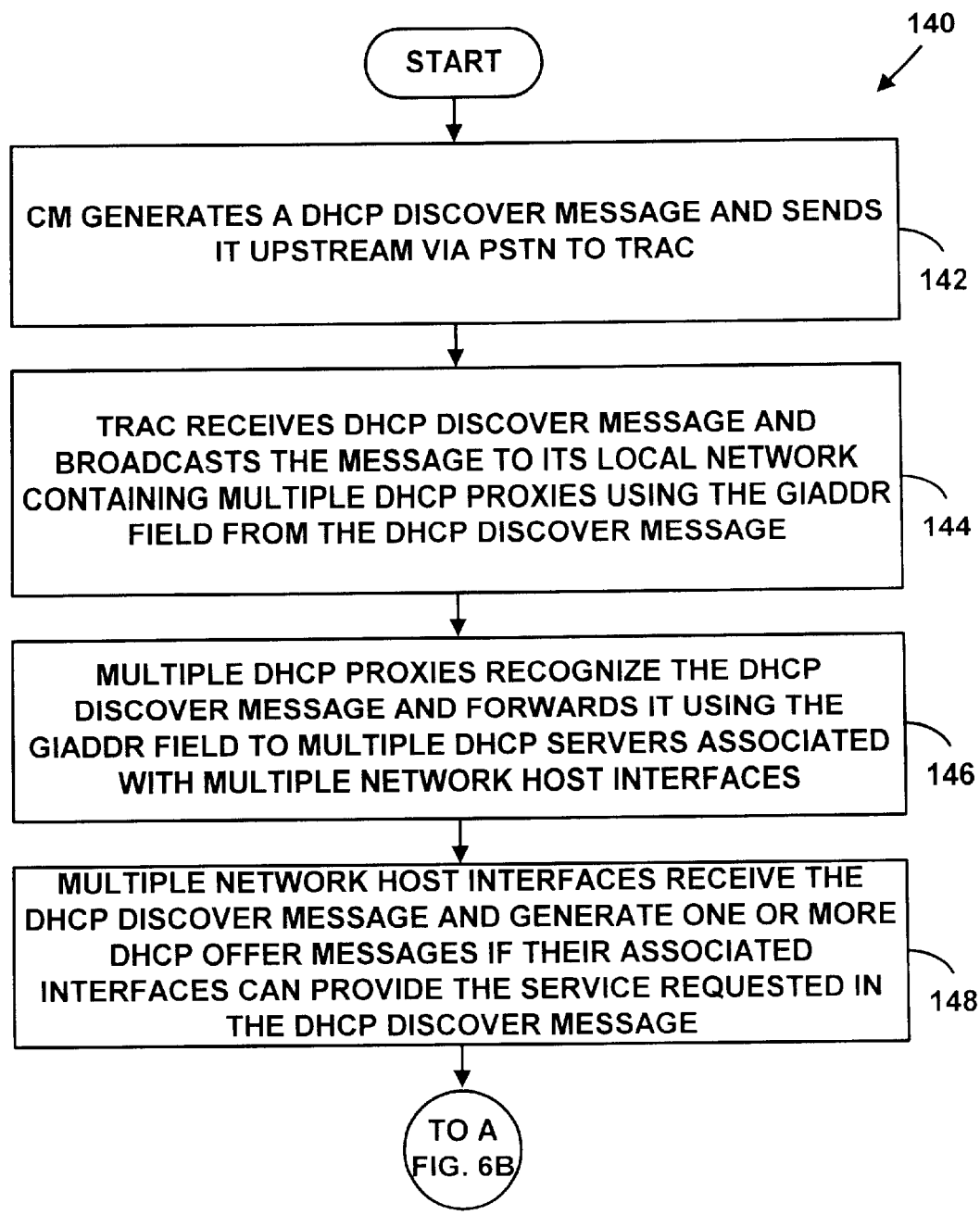
FIGS. 6A and 6B are a flow diagram illustrating a method for discovering hosts in a cable modem system.
Figure 6B:
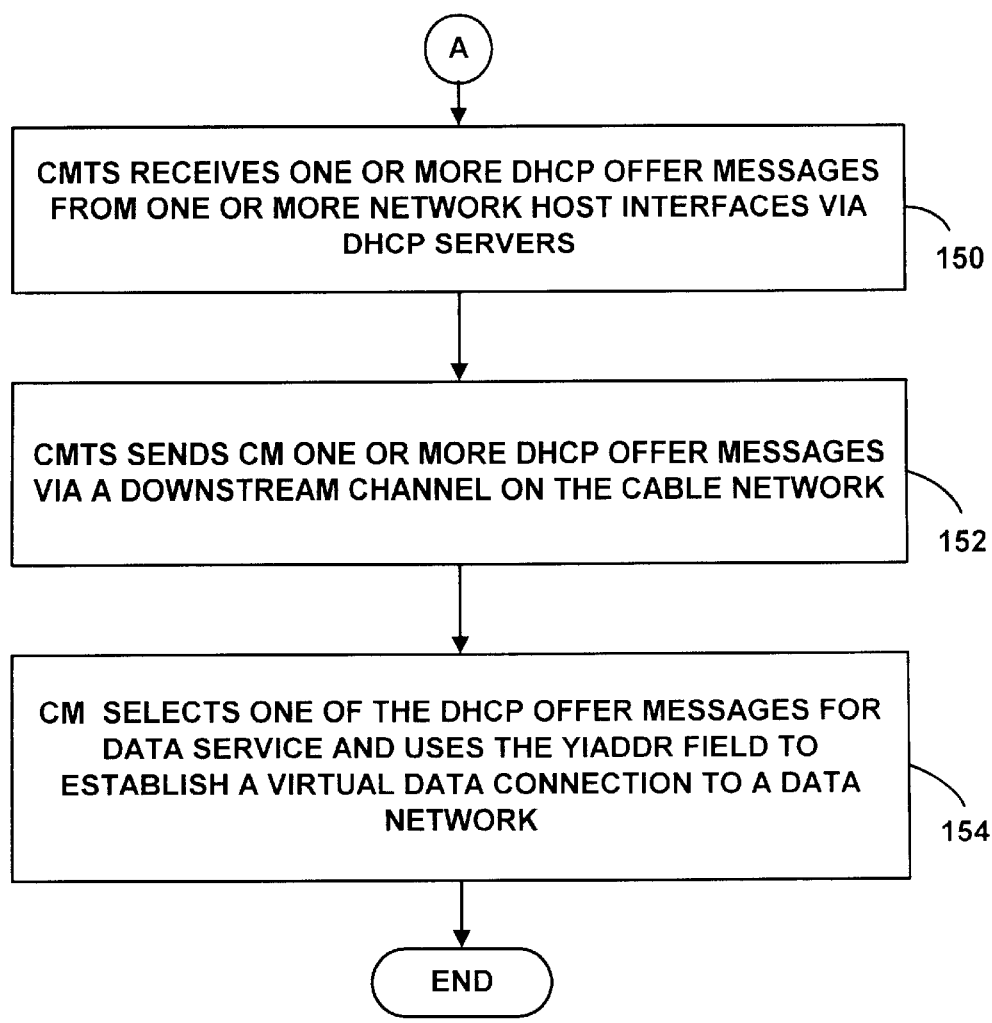

FIGS. 6A and 6B are a flow diagram illustrating a Method 140 for discovering network host interfaces in data-over-cable system 10. In one preferred embodiment of the present inventions with telephony return, after the CM 16 has established an IP 54 link to TRAC 24, via PPP 50, it begins communications with the CMTS 12 via DHCP 66 to complete a virtual IP 54 connection with the data network 28. However, to discover what IP 54 host interfaces might be available on the CMTS 12, the CM 16 has to communicate with the CMTS 12 via an upstream telephony connection to the PSTN 22. and the TRAC 24 since the CM 16 only has a "downstream" cable channel from the CMTS 12 in a data-over-cable system with telephony return.

At Step 142 in FIG. 6A, after receiving a TSI message 76 from the CMTS 12 on a downstream cable connection, the CM 16 generates a DHCP discover ("DHCPDISCOVER") message and sends it upstream via an upstream telephony connection to the PSTN 22 and the TRAC 22 to discover what IP 54 interfaces are associated with the CMTS 12. The fields of the DHCP 66 discover message are set as illustrated in Table 6. However, other field settings may also be used.

TABLE 6

| DHCP 66 Parameter | Description |
|---|---|
| OP 110 | Set to BOOTREQUEST. |
| HTYPE 112 | Set to network type (e.g., one for 10 Mbps Ethernet). |
| HLEN 114 | Set to network length (e.g., six for 10 Mbps Ethernet) |
| HOPS 116 | Set to zero. |
| FLAGS 122 | Set BROADCAST bit to zero. |
| CIADDR 124 | If the CM 16 has previously been assigned an IP 54 address, the IP 54 address is placed in this field. If the CM 16 has previously been assigned an IP 54 address by the DHCP 66, and also has been assigned an address via IPCP, the CM 16 places the DHCP 66 IP 54 address in this field. |
| GIADDR 130 | CM 16 places the Downstream Channel IP 54 address 80 of the CMTS 12 obtained in TSI message 76 on a cable downstream channel in this field. |
| CHADDR 132 | CM 16 places its 48-bit MAC 44 LAN address in this field. |

The DHCPDISCOVER message is used to "discover" the existence of one or more network host interfaces (e.g., IP 54 host interfaces), associated with the CMTS 12. The DHCP 66 giaddr-field 130 (FIG. 5) includes a downstream channel IP address 80 of the CMTS 12 obtained in TSI message 76. Using the downstream channel IP address 80 of the CMTS 12 obtained in TSI message 76 allows the DHCPDISCOVER message to be forwarded by TRAC 24 to the DHCP 66 servers (i.e., protocol servers) associated with network host interfaces associated with the CMTS 12. If the DHCP 66 giaddr-field 130 (FIG. 5) in a DHCP message from a DHCP 66 client is non-zero, a DHCP 66 server sends any return messages to a DHCP 66 server port on a DHCP 66 relaying agent (e.g., the CMTS 12) whose address appears in the DHCP 66 giaddr-field 130.

In a typical DHCP 66 discovery process, the DHCP 66 giaddr-field 130 is set to zero. However, in one preferred embodiment of the present invention, the DHCP 66 giaddr-field 130 contains the IP address 80 of the CMTS 12. If the DHCP 66 giaddr-field 130 is zero, the DHCP 66 client is on the same subnet as the DHCP 66 server, and the DHCP 66 server sends any return messages to either the DHCP 66 client's network address, if that address was supplied in the DHCP 66 ciaddr-field 124 (FIG. 5), or to a client's hardware address (e.g., MAC address 44) specified in the DHCP 66 chaddr-field 132 (FIG. 5) or to a local subnet broadcast address (e.g., 255.255.255.255). If the DHCP 66 giaddr-field 130 is non-zero, a relay agent is being used (e.g., the CMTS 12).

At Step 144, a DHCP 66 layer on TRAC 24 broadcasts the DHCPDISCOVER message on its local network leaving the DHCP 66 giaddr-field 130 intact since it already contains a non-zero value. TRAC's 24 local network includes connections to one or more DHCP 66 proxies (i.e., network host interface proxies). The DHCP 66 proxies accept the DHCP 66 messages originally from the CM 16 destined for DHCP 66 servers associated with network host interfaces associated with the CMTS 12. The TRAC 24 has no direct access to DHCP 66 servers associated with network host interfaces associated with the CMTS 12. The DHCP 66 proxies are not used in a typical the DHCP 66 discovery process known on the art.

One or more DHCP 66 proxies on TRAC's 24 local network recognizes the DHCPDISCOVER message and forwards it to one or more DHCP 66 servers associated with network host interfaces (e.g., IP 54 interfaces) associated with the CMTS 12 at Step 146. Since the DHCP 66 giaddr-field 130 (FIG. 5) in the DHCPDISCOVER message sent by the CM 16 is already non-zero (i.e., contains the downstream IP address of the CMTS 12), the DHCP 66 proxies also leave the DHCP 66 giaddr-field 130 intact.

One or more DHCP 66 servers for network host interfaces (e.g., IP 54 interfaces) available on the CMTS 12 receive the DHCPDISCOVER message and generate a DHCP 66 offer message ("DHCPOFFER") at Step 148. The DHCP 66 offer message is an offer of configuration parameters sent from network host interfaces to the DHCP 66 servers and back to a network host client (e.g., the CM 16) in response to a DHCPDISCOVER message. The DHCP 66 offer message is sent with the message fields set as illustrated in Table 7. However, other field settings can also be used. The DHCP 66 yiaddr-field 126 contains an IP 54 address for a network host interface available on the CMTS 12 and used for receiving data packets from data network 28.

TABLE 7

| DHCP 66 Parameter | Description |
|---|---|
| FLAGS 122 | BROADCAST bit set to zero. |
| YIADDR 126 | IP 54 address from a network host interface to allow the CM 16 |

TABLE 7-continued

| DHCP 66 Parameter | Description |
| --- | --- |
| | to receive data from data network 28 via a network host interface available on the CMTS 12. |
| SIADDR 128 | An IP 54 address for a TFTP 64 server to download configuration information for an interface host. |
| CHADDR 132 | MAC 44 address of the CM 16. |
| SNAME 134 | Optional DHCP 66 server identifier with an interface host. |
| FILE 136 | A TFTP 64 configuration file name for the CM 16. |

DHCP 66 servers send the DHCPOFFER message to the address specified in the DHCP 66 giaddr-field 130 (i.e., the CMTS 12) from the DHCPDISCOVER message if associated network host interfaces (e.g., IP 54 interfaces) can offer the requested service (e.g., IP 54 service) to the CM 16. The DHCPDISOVER message DHCP 66 giaddr-field 130 contains a downstream channel IP address 80 of the CMTS 12 that was received by the CM 16 in TSI message 76. This allows the CMTS 12 to receive the DHCPOFFER messages from the DHCP 66 servers and send them to the CM 16 via a downstream channel on cable network 14.

At Step 150 in FIG. 6B, the CMTS 12 receives one or more DHCPOFFER messages from one or more DHCP 66 servers associated with the network host interfaces (e.g., IP 54 interfaces). THE CMTS 12 examines the DHCP 66 yiaddr-field 126 and DHCP 66 chaddr-field 132 in the DHCPOFFER messages and sends the DHCPOFFER messages to the CM 16 via cable network 14 on a downstream cable channel. The DHCP 66 yiaddr-field 126 contains an IP 54 address for a network host IP 54 interface available on the CMTS 12 and used for receiving IP 54 data packets from data network 28. The DHCP 66 chaddr-field 132 contains the MAC 44 layer address for the CM 16 on a downstream cable channel from the CMTS 12 via cable network 14. The CMTS 12 "knows" the location of the CM 16 since it sent the CM 16 a MAC 44 layer address in one or more initialization messages (e.g., TSI message 76).

If a BROADCAST bit in flags-field 124 is set to one, the CMTS 12 sends the DHCPOFFER messages to a broadcast IP 54 address (e.g., 255.255.255.255) instead of the address specified in the DHCP 66 yiaddr-field 126. The DHCP 66 chaddr-field 132 is still used to determine that MAC 44 layer address. If the BROADCAST bit in the DHCP 66 flags-field 122 is set, the CMTS 12 does not update internal address or routing tables based upon the DHCP 66 yiaddr-field 126 and the DHCP 66 chaddr-field 132 pair when a broadcast message is sent.

At Step 152, the CM 16 receives one or more DHCPOFFER messages from the CMTS 12 via cable network 14 on a downstream connection. At Step 154, the CM 16 selects an offer for IP 54 service from one of the network host interfaces (e.g., an IP interfaces 54) associated with the CMTS 12 that responded to the DHCPDISOVER message sent at Step 142 in FIG. 6A and establishes a virtual IP 54 connection. The selected DHCPOFFER message contains a network host interface address (e.g., IP 54 address) in the DHCP 66 yiaddr-field 126 (FIG. 5). A CM 16 acknowledges the selected network host interface with a DHCP 66 message sequence explained below.

After selecting and acknowledging a network host interface, the CM 16 has discovered an IP 54 interface address available on the CMTS 12 for completing a virtual IP 54 connection with the data network 28. Acknowledging a network host interface is explained below. The virtual IP 54 connection allows IP 54 data from the data network 28 to be sent to the CMTS 12 which forwards the IP 54 packets to the CM 16 on a downstream channel via the cable network 14. The CM 16 sends response IP 54 packets back to data network 28 via the PSTN 22 and the TRAC 24 if telephony return is used. The CM sends response IP packets back to the data network 28 via the CMTS 12 if a two-way cable network is used.

Figure 7:
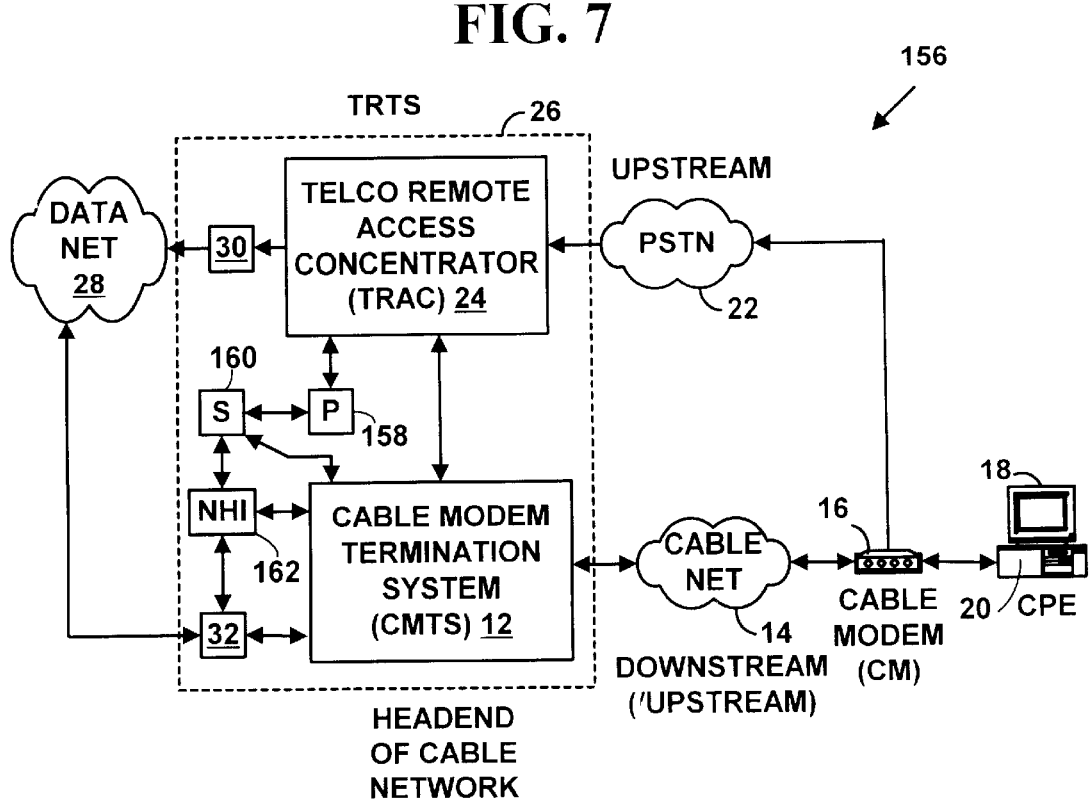
FIG. 7 is a block diagram illustrating a data-over-cable system for the method illustrated in FIGS. 6A and 6B.

FIG. 7 is a block diagram illustrating an exemplary data-over-cable system 156 for the Method illustrated in FIGS. 6A and 6B. Data-over-cable system 156 includes DHCP 66 proxies ("P") 158, DHCP 66 servers ("S") 160 and associated Network Host Interfaces ("NHI") 162 (e.g., IP 54 interfaces), available on the CMTS 12. Multiple DHCP 66 proxies 158, DHCP 66 servers 160 and network host interfaces 162 are illustrated as single boxes in FIG. 7. FIG. 7 also illustrates the DHCP 66 proxies 158 separate from TRAC 24. In one embodiment of the present invention, the TRAC 24 includes integral DHCP 66 proxy functionality and no separate DHCP 66 proxies 158 are used. In such an embodiment, TRAC 24 forwards the DHCP 66 messages using the DHCP 66 giaddr-field 130 to the DHCP 66 servers 160 associated with the CMTS 12.

Figure 8:
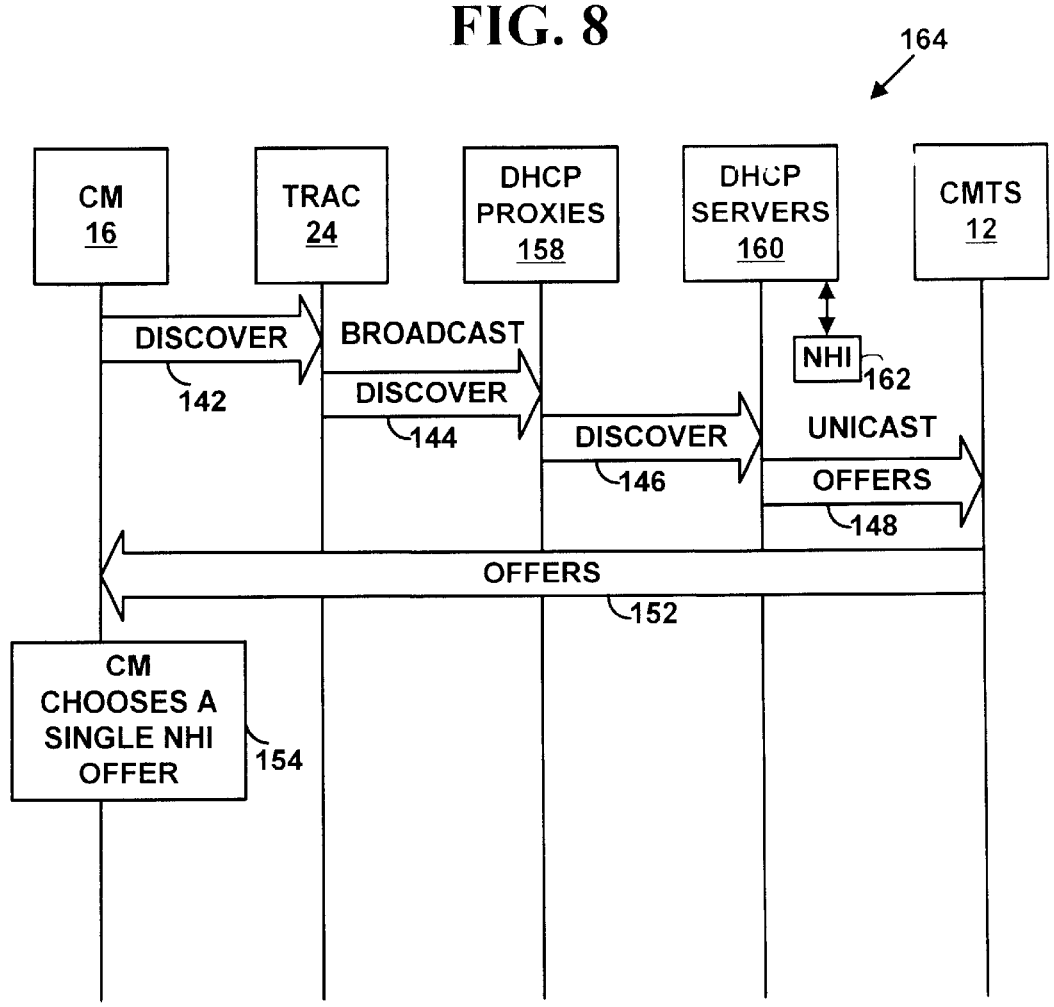
FIG. 8 is a block diagram illustrating the message flow of the method illustrated in FIGS. 6A and 6B.

FIG. 8 is a block diagram illustrating a message flow 162 of Method 140 (FIGS. 6A and 6B). Message flow 162 includes the DHCP proxies 158 and the DHCP servers 160 illustrated in FIGS. 6A and 6B. Steps 142, 144, 146, 148, 150 and 154 of Method 140 (FIGS. 6A and 6B) are illustrated in FIG. 8. In one embodiment of the present invention, the DHCP proxies 158 are not separate entities, but are included in TRAC 24. In such an embodiment, the DHCP proxy services are provided directly by TRAC 24.

Resolving Addresses for Network Host Interfaces

Figure 9A:
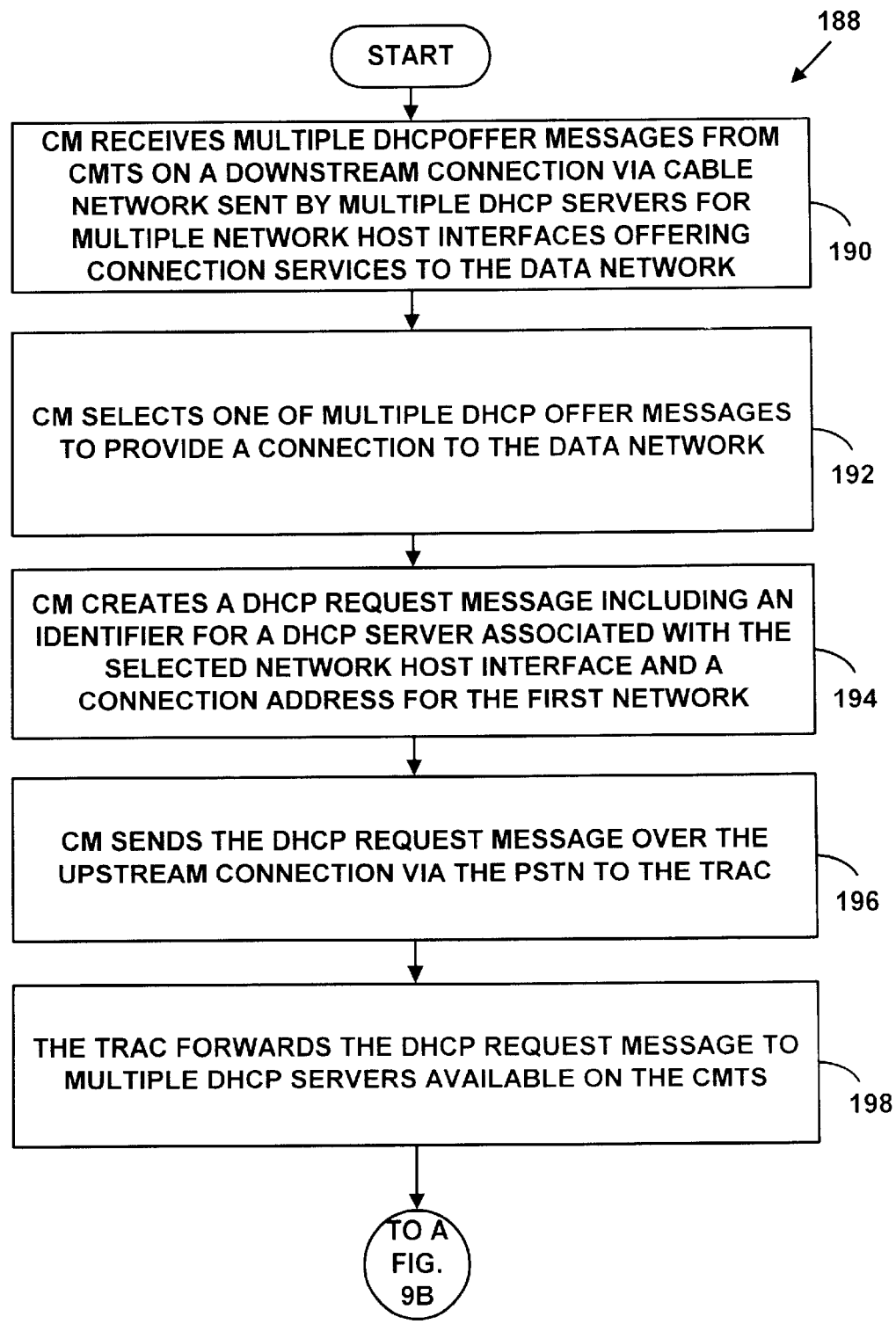

Since the CM 16 receives multiple the DHCPOFFER messages (Step 152 FIG. 6B) the CM 16 resolves and acknowledges one offer from a selected network host interface. FIGS. 9A and 9B are a flow diagram illustrating a Method 188 for resolving discovered host addresses in data-over-cable system 10 with telephony return.

At Step 190 in FIG. 9A, the CM 16 receives one or more DHCPOFFER messages from one or more of the DHCP 66 servers 160 associated with one or more network host interfaces 162 (e.g., IP 54 interfaces) associated with the CMTS 12. The one or more DHCPOFFER messages include the DHCP 66 fields set as illustrated in Table 7 above. However, other field settings could also be used. At Step 192, the CM 16 selects one of the DHCPOFFER messages. At Step 194, the CM 16 creates a DHCP 66 request message ("DHCPREQUEST") message to request the services offered by a network host interface 168 selected at Step 192. The fields of the DHCP request message are set as illustrated in Table 8. However, other field settings may also be used.

TABLE 8

| DHCP 66 Parameter | Description |
| --- | --- |
| OP 110 | Set to BOOTREQUEST. |
| HTYPE 112 | Set to network type (e.g., one for 10 Mbps Ethernet). |
| HLEN 114 | Set to network length (e.g., six for 10 Mbps Ethernet) |
| HOPS 116 | Set to zero. |
| FLAGS 122 | Set BROADCAST bit to zero. |

TABLE 8-continued

| DHCP 66 Parameter | Description |
|---|---|
| CIADDR 124 | If the CM 16 has previously been assigned an IP address, the IP address is placed in this field. If the CM 16 has previously been assigned an IP address by the DHCP 66, and also has been assigned an address via IPCP, the CM 16 places the DHCP 66 IP 54 address in this field. |
| YIADDR 126 | IP 54 address sent from the selected network interface host in DHCPOFFER message |
| GIADDR 130 | CM 16 places the Downstream Channel IP 54 address 80 the CMTS 12 obtained in TSI message 76 on a cable downstream channel in this field. |
| CHADDR 132 | CM 16 places its 48-bit MAC 44 LAN address in this field. |
| SNAME 134 | DHCP 66 server identifier for the selected network interface host |

The DHCPREQUEST message is used to "request" services from the selected IP 54 host interface 162 associated with the CMTS 12 using a DHCP 66 server 160 associated with the selected network host interface 162. The DHCP 66 giaddr-field 130 (FIG. 5) includes the downstream channel IP address 80 for the CMTS 12 obtained in TSI message 76. Putting the downstream channel IP address 80 obtained in TSI message 76 in a DHCPREQUEST message allows the DHCPREQUEST message to be forwarded by the TRAC 24 to the DHCP 66 servers 160 associated with network host interfaces 162 associated with the CMTS 12. The DHCP 66 giaddr-field 126 contains an identifier and the DHCP 66 sname-field 134 contains a DHCP 66 server identifier 160 associated with the selected network host interface.

If the DHCP 66 giaddr-field 130 in a DHCP 66 message from a DHCP 66 client is non-zero, a DHCP 66 server 160 sends any return messages to a DHCP 66 server port on a DHCP 66 relaying agent (e.g., the CMTS 12) whose address appears in DHCP 66 giaddr-field 130. If DHCP 66 giaddr-field 130 is zero, the DHCP 66 client is on the same subnet as the DHCP 66 server, and the DHCP 66 server sends any return messages to either the DHCP 66 client's network address, if that address was supplied in the DHCP 66 ciaddr-field 124, or to the client's hardware address specified in the DHCP 66 chaddr-field 132 or to the local subnet broadcast address.

Returning to FIG. 9A at Step 196, the CM 16 sends the DHCPREQUEST message on the upstream telephony connection to TRAC 24 via the PSTN 22. At Step 198, a DHCP 66 layer on TRAC 24 broadcasts the DHCPREQUEST message on its local network leaving the DHCP 66 giaddr-field 130 intact since it already contains a non-zero value. The TRAC's 24 local network includes connections to one or more DHCP 66 proxies 158. The DHCP 66 proxies 158 accept DHCP 66 messages originally from the CM 16 destined for the DHCP 66 servers 160 associated with network host interfaces 168 associated with the CMTS 12. In another embodiment of the present invention, TRAC 24 provides the DHCP 66 proxy functionality, and no separate DHCP 66 proxies are used.

The one or more DHCP 66 proxies 158 on TRAC's 24 local network message forwards the DHCPOFFER to one or more of the DHCP 66 servers 160 associated with network host interfaces 162 (e.g., IP 54 interfaces) available on the CMTS 12 at Step 200 in FIG. 9B. Since DHCP 66 giaddr-field 130 in the DHCPDISCOVER message sent by the CM 16 is already non-zero (i.e., contains the downstream IP address of the CMTS 12), the DHCP 66 proxies leave 158 the DHCP 66 giaddr-field 130 intact.

One or more of the DHCP 66 servers 160 for the selected network host interfaces 162 (e.g., IP 54 interface) associated with the CMTS 12 receives the DHCPOFFER message at Step 202. A selected DHCP 66 server 160 recognizes a DHCP 66 server identifier in the DHCP 66 sname-field 134 or the IP 54 address that was sent in the DHCPOFFER message in the DHCP 66 yiaddr-field 126 from the DHCPREQUST message as being for the selected DHCP 66 server 160.

The selected DHCP 66 server 160 associated with network host interface 162 selected by the CM 16 in the DHCPREQUEST message creates and sends a DHCP 66 acknowledgment message ("DHCPACK") to the CMTS 12 at Step 204. The DHCPACK message is sent with the message fields set as illustrated in Table 9. However, other field settings can also be used. The DHCP 66 yiaddr-field again contains the IP 54 address for the selected network host interface available on the CMTS 12 for receiving data packets from data network 28.

TABLE 9

| DHCP 66 Parameter | Description |
|---|---|
| FLAGS 122 | Set a BROADCAST bit to zero. |
| YIADDR 126 | IP 54 address for the selected network host interface to allow the CM 16 to receive data from data network 28. |
| SIADDR 128 | An IP 54 address for a TFTP 64 server to download configuration information for an interface host. |
| CHADDR 132 | MAC 44 address of the CM 16. |
| SNAME 134 | DHCP 66 server identifier associated with the selected network host interface. |
| FILE 136 | A configuration file name for an network interface host. |

The selected DHCP 66 server 160 sends the DHCACK message to the address specified in the DHCP 66 giaddr-field 130 from the DHCPREQUEST message to the CM 16 to verify the selected network host interface (e.g., IP 54 interface) will offer the requested service (e.g., IP 54 service).

At Step 206, the CMTS 12 receives the DHCPACK message from the selected DHCP 66 server 160 associated with the selected network host interface 162 IP 54 address (e.g., IP 54 interface). The CMTS 12 examines the DHCP 66 yiaddr-field 126 and the DHCP 66 chaddr-field 132 in the DHCPACK message. The DHCP 66 yiaddr-field 126 contains an IP 54 address for a network host IP 54 interface available on the CMTS 12 and used for receiving IP 54 data packets from data network 28 for the CM 16. The DHCP 66 chaddr-field 132 contains the MAC 44 layer address for the CM 16 on a downstream cable channel from the CMTS 12 via cable network 14.

CMTS 12 updates an Address Resolution Protocol ("ARP") table and other routing tables on the CMTS 12 to reflect the addresses in the DHCP 66 yiaddr-field 126 and the DHCP 66 chaddr-field 132 at Step 208. As is known in the art, ARP allows a gateway such as the CMTS 12, to forward any datagrams from a data network such as data network 28 it receives for hosts such as the CM 16. For more information on ARP see, RFC-826, incorporated herein by reference.

CMTS 12 stores a pair of network address values in the ARP table, the IP 54 address of the selected network host interface from the DHCP 66 yiaddr-field 126 and a Network Point of Attachment ("NPA") address. In one preferred embodiment of the present invention, The NPA address is a MAC 44 layer address for the CM 16 via a downstream cable channel. The IP/NPA address pair are stored in local routing tables with the IP/NPA addresses of hosts (e.g., the CMs 16) that are attached to cable network 14.

At Step 210, the CMTS 12 sends the DHCPACK message to the CM 16 via the cable network 14. At Step 212, the CM 16 receives the DHCPACK message, and along with the CMTS 12 has addresses for a "virtual connection" between the data network 28 and the CM 16. When data packets arrive on the IP 54 address for the selected CM 16 they are sent to the CMTS 12 and the CMTS 12 forwards them using a NPA (i.e., a MAC 44 address) from the routing tables on a downstream channel via the cable network 14 to the CM 16.

If a BROADCAST bit in the DHCP 66 flags-field 124 is set to one in the DHCPACK, the CMTS 12 sends the DHCPACK messages to a broadcast IP 54 address (e.g., 255.255.255.255). The DHCP 66 chaddr-field 132 is still used to determine a MAC 44 layer address. If the BROADCAST bit in the DHCP 66 flags field 122 is set, the CMTS 12 does not update the ARP table or other routing tables based upon the DHCP 66 yiaddr-field 126 and the DHCP 66 chaddr-field 132 pair when a broadcast message is sent.

Figure 10:
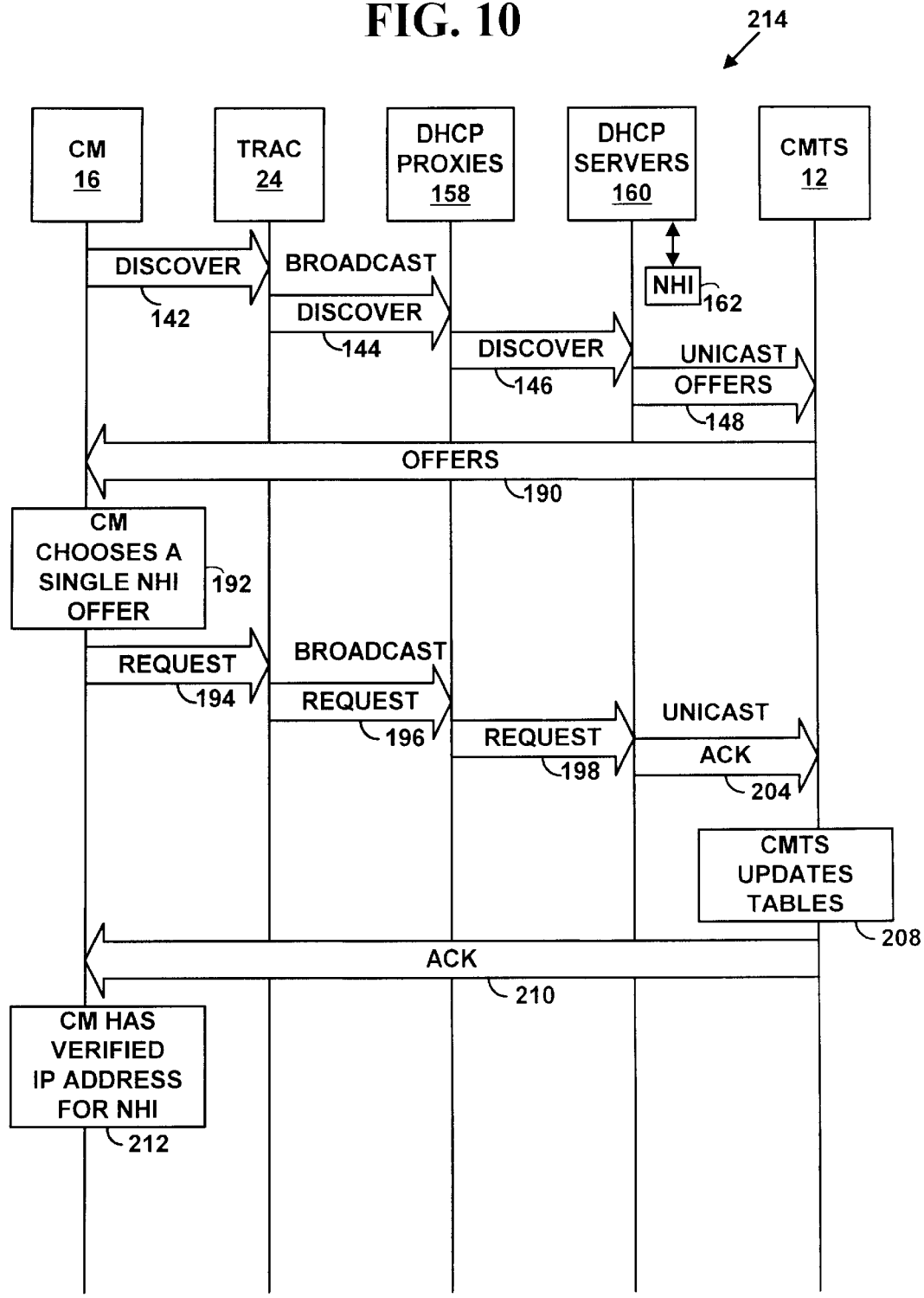
FIG. 10 is a block diagram illustrating the message flow of the method illustrated in FIGS. 9A and 9B.

FIG. 10 is a block diagram illustrating the message flow 214 of the Method 188 illustrated in FIGS. 9A and 9B. Message flow 214 includes the DHCP proxies 158 and the DHCP servers 160 illustrated in FIG. 7. Method Steps 194, 196, 198, 204, 208, 210 and 212 of Method 188 (FIGS. 9A and 9B) are illustrated in FIG. 10. In one embodiment of the present invention, the DHCP proxies 158 are not separate entities, but are included in TRAC 24. In such an embodiment, the DHCP proxy services are provided directly by TRAC 24.

After Method 188, the CMTS 12 has a valid IP/MAC address pair in one or more address routing tables including an ARP table to forward IP 54 data packets from data network 28 to the CM 16, thereby creating a virtual IP 54 data path to/from the CM 16 as was illustrated in and Table 3. The CM 16 has necessary parameters to proceed to the next phase of initialization, a downloading of a configuration file via TFTP 64. Once the CM 16 has received the configuration file and has been initialized, it registers with the CMTS 12 with a registration message and is ready to receive data from data network 14.

In the event that the CM 16 is not compatible with the configuration of the network host interface 162 received in the DHCPACK message, the CM 16 may generate a DHCP 66 decline message ("DHCPDECLINE") and transmit it to TRAC 24 via the PSTN 22. A DHCP 66 layer in TRAC 24 forwards the DHCPDECLINE message to the DHCP servers 160 and the CMTS 12. Upon seeing a DHCPDECLINE message, the CMTS 12 flushes its ARP tables and routing tables to remove the now invalid IP/MAC pairing. The CM 16 may also send the DHCPDECLINE message to the CMTS 12 on an upstream cable connection. The CMTS 12 will then forward the DHCPDECLINE message to the appropriate DHCP 66 server 160. If an IP 54 address for a network host interface is returned in a DHCPACK that is different from the IP 54 address sent by the CM 16 in the DCHCPREQUEST message, the CM 16 uses the IP 54 address it receives in the DHCPACK message as the IP 54 address of the selected network host interface for receiving data from data network 28.

One preferred embodiment of the present invention is described with respect to, but is not limited to a data-over-cable-system with telephony return. Method 142 and Method 188 can also be used with a cable modem that has a two-way connection (i.e., upstream and downstream) to the cable network 14 and the CMTS 12. In a data-over-cable-system without telephony return, the CM 16 would broadcast the DHCPREQUEST message to one or more DHCP 66 servers 160 associated with one or more network host interfaces 162 associated with the CMTS 12 using an upstream cable connection on the data network 14 including the IP 54 address of the CMTS 12 in the DHCP 66 giaddr-field 130. In such an embodiment, the upstream telephony connection, the PSTN 22, the TRAC 24 and the DHCP 66 proxies 158, ate not used. If an upstream cable connection is used instead of an upstream telephony return channel, method steps in Methods 142 and 188 associated with the PSTN 22, the TRAC 24 and the DHCP proxies are skipped. Method 188 accomplishes resolving addresses for network interface hosts from a cable modem in a data-over-cable with or without telephony return, and without extensions to the existing DHCP protocol.

CPE Initialization in a Data-over-cable System

Figure 11A:
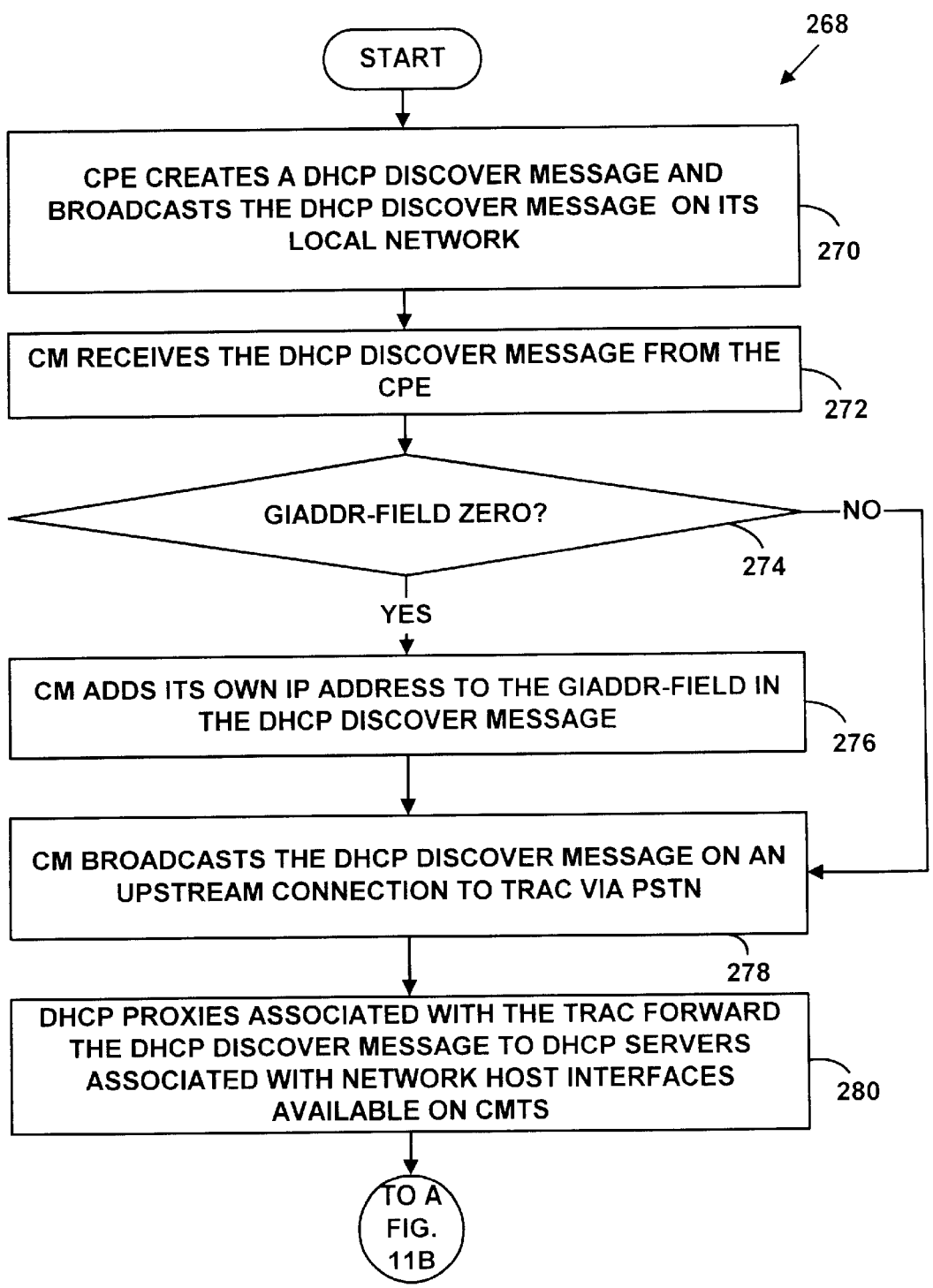
FIGS. 11A and 11B are a flow diagram illustrating a method for addressing network host interfaces from customer premise equipment.
Figure 11B:
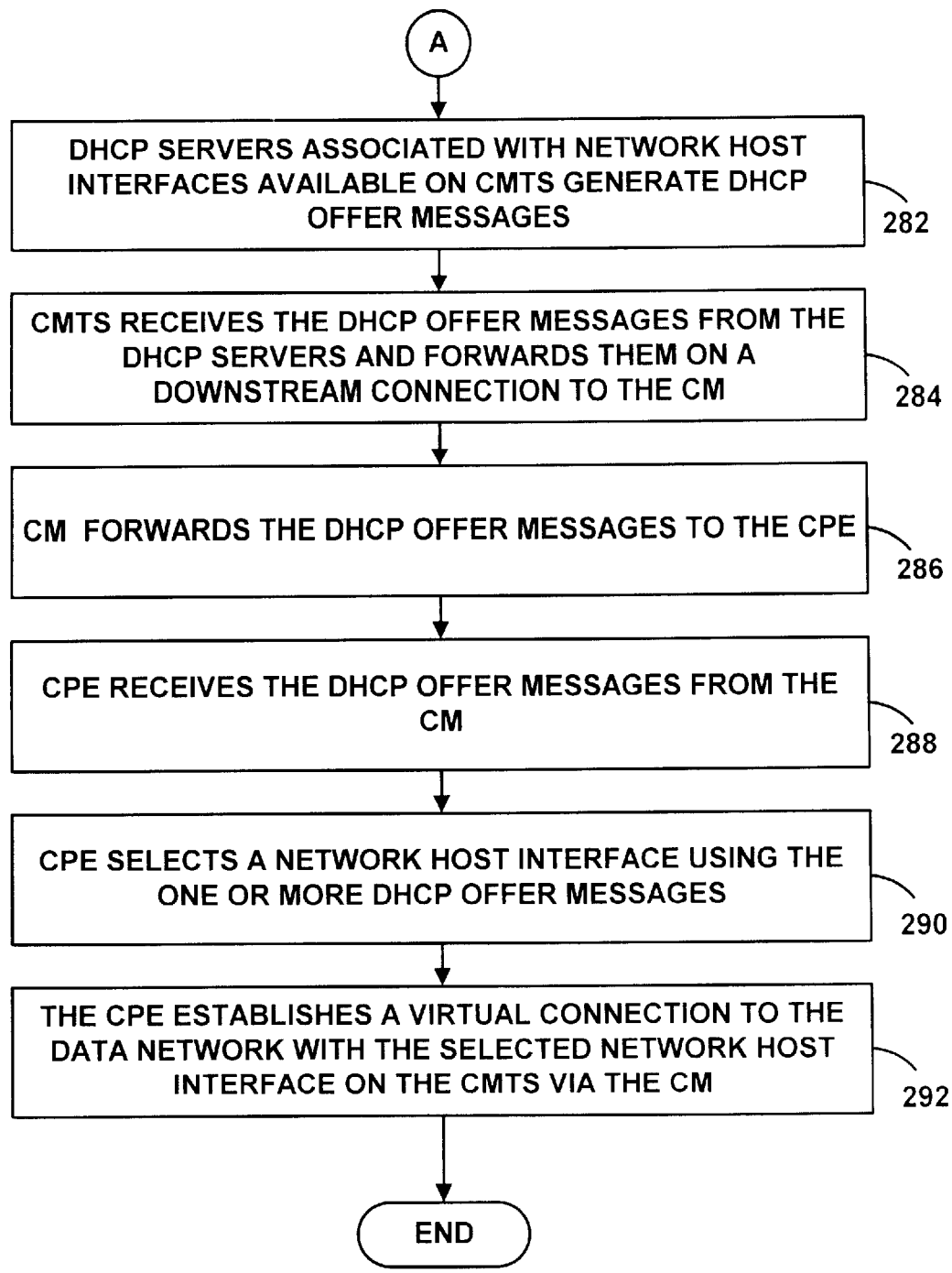

The CPE 18 also uses the DHCP 66 to generate requests to obtain IP 54 addresses to allow CPE 18 to also receive data from data network 28 via the CM 16. In a preferred embodiment of the present invention, the CM 16 functions as a standard BOOTP relay agent/DHCP Proxy 158 to facilitate CPE's 18 access to the DHCP 66 server 160 FIGS. 11A and 11B are a flow diagram illustrating a Method 268 for addressing network host interfaces 162 from CPE 18. At Step 270 in FIG. 11A, the CPE 18 generates a DHCPDISCOVER message broadcasts the DHCPDISCOVER message on its local network with the fields set as illustrated in Table 6 above with addresses for CPE 18 instead of the CM 16. However, more or fewer field could also be set in the DHCPDISCOVER message. The CM 16 receives the DHCPDISCOVER as a standard BOOTP relay agent at Step 272. The DHCPDISCOVER message has a MAC 44 layer address for the CPE 18 in the DHCP 66 chaddr-field 132, which the CM 16 stores in one or more routing tables (e.g., ARP tables). As a BOOTP relay agent, the CM 16 checks the DHCP 66 giaddr-field 130 (FIG. 5) at Step 274. If the DHCP 66 giaddr-field 130 is set to zero, the CM 16 put its own IP 54 address into the DHCP 66 giaddr-field 130 at Step 276, including the CM 16 is a relay agent.

If the DHCP 66 giaddr-field 130 is non-zero, the CM 16 does not alter the DHCP 66 giaddr-field 130 since there could be another BOOTP relay agent attached to CPE 18 which may have already set the DHCP 66 giaddr-field 130. A BOOTP relay agent attached to CPE 18 would have also have acquired its IP 54 address using a DHCP 66 discovery process similar to the one described above (e.g., FIG. 10).

Returning to FIG. 11A, at Step 278, the CM 16 broadcasts the DHCPDISCOVER message to a broadcast address via the PSTN 22 to the TRAC 24. In one embodiment of the present invention, the broadcast address is an IP 54 broadcast address (e.g., 255.255.255.255). At Step 280, one or more DHCP 66 proxies 158 associated with TRAC 24, recognize the DHCPDISOVER message, and forward it to one or more DHCP 66 servers 160 associated with one or more network host interfaces 162 associated with the CMTS 12. Since the DHCP 66 giaddr-field 130 is already non-zero, the DHCP proxies 160 leave the DHCP 66 giaddr-field 130 intact. In another embodiment of the present invention, TRAC 24 includes DHCP 66 proxy 158 functionality and no separate DHCP 66 proxies 158 are used. In yet another embodiment of the present invention, the CM 16 broadcasts the DHCPDISCOVER message to the CMTS 12 on an upstream cable connection. The CMTS 12 forwards the DHCPDISCOVER message to one or more DHCP servers 160.

At Step 282 in FIG. 11B, the one or more DHCP servers 160 receive the DHCPDISCOVER message from one or more DHCP proxies 158 and generate one or more DHCPOFFER messages to offer connection services for one or more network host interfaces 162 associated with the CMTS 12 with fields set as illustrated in Table 7. The one or more DHCP 66 servers 160 send the one or more DHCPOFFER messages to the address specified in the DHCP 66 giaddr-field 130 (e.g., the CM 16 or a BOOTP relay agent associated with CPE 18), which is an IP 54 address already contained in an ARP or other routing table in the CMTS 12. Since the CMTS 12 also functions as a relay agent for the one or more DHCP servers 160, the one or more DHCPOFFER messages are received on the CMTS 12 at Step 284.

The CMTS 12 examines the DHCP 66 yiaddr-field 126 and the DHCP 66 giaddr-field 130 in the DHCPOFFER messages, and sends the DHCPOFFER messages down cable network 14 to IP 54 address specified in the DHCP 66 giaddr-field 130. The MAC 44 address for the CM 16 is obtained through a look-up of the hardware address associated with the DHCP 66 chaddr-field 130 (e.g., using ARP). If the BROADCAST bit in the DHCP 66 flags-field 122 is set to one, the CMTS 12 sends the DHCPOFFER message to a broadcast IP 54 address (e.g., 255.255.255.255), instead of the address specified in the DHCP 66 yiaddr-field 126. The CMTS 12 does not update its ARP or other routing tables based upon the broadcast DHCP 66 yiaddr-field 126 DHCP 66 chaddr-field 132 address pair.

Returning to FIG. 11B, the CM 16 receives the one or more DHCPOFFER messages and forwards them to CPE 18 at Step 286. The CM 16 uses the MAC 44 address specified by the DHCP 66 chaddr-field 132 look-up in its routing tables (e.g., an ARP table) to find the address of CPE 18 even if the BROADCAST bit in the DHCP 66 flags-field 122 is set. At Step 290, the CPE 18 receives the one or more DHCPOFFER messages from the CM 16. At Step 292, CPE the 18 selects one of the DHCPOFFER messages to allow a virtual connection to be established between the data network 28 and the CPE 18. Method 266 accomplishes addressing network interface hosts from CPE 18 in data-over-cable system 10 without extensions to the existing DHCP 66 protocol.

FIGS. 12A and 12B are a flow diagram illustrating a Method 294 for resolving network host interfaces from the CPE 18. At Step 296 of FIG. 12A, the CPE 18 receives the one or more DHCPOFFER messages from the one or more DHCP 66 servers 160 associated with the one or more network host interfaces associated with the CMTS 12. At Step 298, the CPE 18 chooses one offer of services from a selected network host interface 162. At Step 300, the CPE 18 generates a DHCPREQUEST message with fields set as illustrated in Table 8 above with addresses for CPE 18 instead of the CM 16. However, more or fewer fields could also be set. At Step 302, CPE 18 sends the DHCPREQUEST message to the CM 16. At Step 304, the CM 16 forwards the message to TRAC 24 via the PSTN 22 (or to the CMTS 12 via an upstream cable connection if a two-way cable system is being used).

At Step 306, a DHCP proxies 158 associated with the TRAC 24 broadcasts the DHCPREQUEST message on its local network leaving the DHCP 66 giaddr-field 130 intact since it already contains a non-zero value. The TRAC's 24 local network includes connections to one or more DHCP 66 proxies 158. The DHCP 66 proxies 158 accept the DHCP 66 messages originally from the CPE 18 destined for the DHCP 66 servers 160 associated with network host interfaces 162 associated with the CMTS 12. In another embodiment of the present invention, TRAC 24 provides the DHCP 66 proxy functionality, and no separate DHCP 66 proxies 158 are used.

One or more DHCP 66 proxies 158 on TRAC's 24 local network recognize the DHCPOFFER message and forward it to one or more of the DHCP 66 servers 160 associated with network host interfaces 162 (e.g., IP 54 interfaces) associated with the on the CMTS 12 at Step 308 in FIG. 12B. Since the DHCP 66 giaddr-field 130 in the DHCPDISCOVER message sent by the CPE 18 is already non-zero, (i.e., set by the CM 16) the DHCP 66 proxies leave the DHCP 66 giaddr-field 130 intact.

One or more DHCP 66 servers 160 for the selected network host interfaces 162 (e.g., IP 54 interface) associated with the CMTS 12 receive the DHCPOFFER message at Step 310. A selected the DHCP 66 server 160 recognizes a DHCP 66 server identifier in the DHCP 66 sname-field 134 or the IP 54 address that was sent in the DHCPOFFER message in the DHCP 66 yiaddr-field 126 from the DHCPREQUST message for the selected the DHCP 66 server 160.

The selected DHCP 66 server 160 associated with network host interface 162 selected by the CPE 18 in the DHCPREQUEST message creates and sends a DHCP 66 acknowledgment message ("DHCPACK") to the CMTS 12 at Step 312 using the DHCP 66 giaddr-field 130. The DHCPACK message is sent with the message fields set as illustrated in Table 9. However, other field settings can also be used. The DHCP 66 yiaddr-field contains the IP 54 address for the selected network host interface 162 available on the CMTS 12 for receiving data packets from data network 28 for CPE 18.

At Step 314, the CMTS 12 receives the DHCPACK message. the CMTS 12 examines the DHCP 66 giaddr-field 130 and looks up that IP 54 address in its ARP table or other routing tables for an associated MAC 44 address. This is a MAC 44 address for the CM 16, which sent the DHCPREQUEST message from CPE 18. The CMTS 12 uses the MAC 44 address associated with the DHCP 66 giaddr-field 130 and the DHCP 66 yiaddr-field 126 to update its routing and ARP tables reflecting this address pairing at Step 316. At Step 318, the CMTS 12 sends the DHCPACK message on a downstream channel on cable network 14 to the IP 54 and MAC 44 addresses, respectively (i.e., to the CM 16). If the BROADCAST bit in the DHCP 66 flags-field 122 is set to one, the CMTS 12 sends the DHCPACK message to a broadcast IP 54 address (e.g., 255.255.255.255), instead of the address specified in the DHCP 66 yiaddr-field 126. the CMTS 12 uses the MAC 44 address associated with the DHCP 66 chaddr-field 130 even if the BROADCAST bit is set.

The CM 16 receives the DHCPACK message. The CM 16 examines the DHCP 66 yiaddr-field 126 and DHCP 66 chaddr-field 132, and updates its routing table and ARP tables to reflect the address pairing at Step 320. At Step 322, the CM 16 sends the DHCPACK message to CPE 18 via the CMCI 20 at the IP 54 and the MAC 44 addresses respectively from its routing tables. If the BROADCAST bit in the DHCP 66 flags-field 122 is set to one, the CM 16 sends the downstream packet to a broadcast IP 54 address (e.g., 255.255.255.255), instead of the address specified in the DHCP 66 yiaddr-field 126. The CM 16 uses the MAC 44 address specified in the DHCP 66 chaddr-field 132 even if the BROADCAST bit is set to locate the CPE 18. At Step 324, CPE 18 receives the DHCPACK from the CM 16 and has established a virtual connection to data network 28.

In the event that the CPE 18 is not compatible with the configuration received in the DHCPACK message, the CPE 18 may also generate a DHCP 66 decline ("DHCPDECLINE") message and send it to the CM 16. The CM 16 will transmit the DHCPDECLINE message up the PPP 50 link via the PSTN 22 to TRAC 24 or the CMTS 12 via an upstream cable connection. On seeing a DHCPDECLINE message the TRAC 24 sends a unicast copy of the message to the CMTS 12. the CM 16 and the CMTS 12 examine the DHCP 66 yiaddr-field 126 and the DHCP 66 giaddr-field 130, and update their routing and ARP tables had routing tables to flush any invalid pairings.

Upon completion of Methods 266 and 292, the CM 16 and the CMTS 12 have valid IP/MAC address pairings in their routing and ARP tables. These tables store the same set of IP 54 addresses, but does not associate them with the same MAC 44 addresses. This is because the CMTS 12 resolves all the CPE 18 IP 54 addresses to a MAC 44 address of a corresponding the CM 16. The CMs 16, on other hand, is able to address the respective MAC 44 addresses of their own CPEs 18. This also allows the DHCP 66 clients associated with the CPE 18 to function normally since the addressing that is done in the CM 16 CM 16 and the CMTS 12 is transparent to CPE 18 hosts.

FIG. 13 is a block diagram illustrating a message flow 326 for Methods 268 and 294 in FIGS. 11A, 11B, and 12A and 12B. Message flow 326 illustrates a message flow for Methods 268 and 294, for a data-over-cable system with and without telephony return. In another embodiment of the present invention, the CM 16 forwards requests from CPE 18 via an upstream cable connection on cable network 14 to the DHCP servers 160 associated with one or more network host interfaces 162 associated with the CMTS 12. In such an embodiment, upstream telephony return channel, the PSTN 22, the TRAC 24 and the DHCP proxies 158 are not used.

Method 268 and 294 accomplishes resolving addresses for network interface hosts from customer premise equipment in a data-over-cable with or without telephony return without extensions to the existing DHCP protocol. Methods 268 and 294 of the present invention are illustrated in data-over-cable system 10 with telephony return. However, the present invention is not limited to data-over-cable system 10 with telephony return and can be used in data-over-cable system 10 without telephony return by using an upstream cable connection instead of an upstream telephony connection and skipping method steps from Methods 268 and 294 associated with the PSTN 22, the TAC 24 and the DHCP 66 proxies 158.

Completing Initialization of a Cable Modem or CPE

After obtaining an IP 54 address via DHCP 66, the CM 16 receives a configuration file from a configuration file server. Information about the configuration file is included in the DHCPACK message (e.g., Table 9). For example, in one preferred embodiment of the present invention, a network address (e.g., an IP 54 address) for the server is included in a DHCP 66 siaddr-field 128 (FIG. 5), and a name of the configuration file in a DHCP 66 file-field 136. The configuration file includes multiple configuration parameters used to initialize the CM 16. The TFTP 64 server obtains the requested configuration file and sends it to the CM 16. In one embodiment of the present invention, the configuration file is obtained by the TFTP 64 server from the DHCP server 160. In another embodiment of the present invention, the configuration file is obtained by the TFTP 64 server from the CMTS 12.

Configuration information from an exemplary configuration file is illustrated in Type/Length/Value ("TLV") format in Table 10. However, more or fewer configuration parameters could also be used. In addition, only an exemplary description of the Value in the TLV format is included since the actual numbers used for the Value fields are implementation specific.

TABLE 10

| Type | Length | Value | Notes |
| --- | --- | --- | --- |
| 4x | 6 | Variable | Header Length |
| 41 | 1 | 1 | Class-Of-Service-1 |
| 42 | 4 | 1,500,000 | Maximum downstream data rate of 1.5 Mbps |
| 43 | 4 | 256,000 | Maximum upstream data rate of 256 Kbps |
| 44 | 1 | 5 | Priority is level 5. |
| 45 | 4 | 8,000 | Minimum upstream data rate of 8 Kbps |
| 47 | 1 | 1 | Privacy enabled |
| 171 | 4 | 1 | Authorize timeouts |
| 3 | 1 | 1 | Enable network access |
| 8x | 8 | Variable | Vendor ID |
| 83 | N | Variable | N-bytes of vendor specific data in TLV format |
| 0 | N | N-byte padding | Padding to make message 4-byte aligned |
| 255 | N/A | | End-of-file |

The CPE 18 may also receive a configuration file, if necessary from the CM 16, CMTS 12, or the DHCP server 160 via the TFTP 64 server. The CPE 18 also receives information on where to find a configuration file, if necessary, in a DCHPACK message. However, the CPE 18 may also receive information on where to find a configuration file with other messages (e.g., MAC 44) from the CM 16 or the CMTS 12.

After receiving a configuration file, the CM 16 sends a registration message to the CMTS 12. The registration message is typically a MAC 44 management message that includes a MAC 44 management header and selected information from the configuration file (e.g., from Table 10) in TLV format. The registration message is sent within a pre-determined time after receiving a DHCPACK to provide a security measure to protect the data-over-cable system 10. If the registration message is not sent to the CMTS 12 within the pre-determined time, the CMTS 12 purges its ARP and routing tables of entries including the IP 54 address obtained by the CM 16 with DHCP 66. This helps prevent a rogue CM 16 from registering with the CMTS 12.

If a data-over-cable system with telephony return is being used, the registration message is sent on an upstream telephony connection with PPP 50 via the PSTN 22 and TRAC 24 to the CMTS 12. If a data-over-cable system without telephony return is being used, the registration message is sent on an upstream cable connection to the CMTS 12.

Upon receiving the registration message from the CM 16, the CMTS 12 updates its routing and ARP tables to reflect a CM 16 IP 54/MAC 44 address pairing in the registration message. The CMTS 12 will generate an SNMP 62 trap if an IP 54 address in the registration message is paired with a different MAC 44 address for the CM 16 in the CMTS 12 tables. As is known in the art, an SNMP 62 trap is used to indicate an error condition in a network. As was discussed above, the CMTS 12 records an IP 54 address obtained by the CM 16 with DHCP 66 before it forwards the DHCPACK to the CM 16.

The CMTS 12 sends a registration response back to the CM 16 that also includes CPE 18 IP 54 addresses in the CMTS 12 routing and ARP tables which are associated with a MAC 44 address for the CM 16, if any. However, the CPE 18 may not have obtained an IP 54 address with DHCP 66 yet. The registration response message is also typically a MAC 44 management message with MAC 44 management header and TLV encoded data for the CM 16 (e.g., CMTS 12 data or vendor specific data).

The CM 16 may also proxy ARP for any CPE 18 IP 54 addresses in a registration response message. The CM 16 will use ARP on the CMCI 20 (FIG. 1) for the hardware addresses of the CPE 18 IP 54 addresses and update routing and ARP tables on the CM 16.

The CPE 18 may also send a registration message to the CMTS 12 via the CM 16, and may also receive a registration response from the CMTS 12 via the CM 16. If the CPE 18 sends a registration message, both the CM 16 and the CMTS 12 update ARP and other routing tables. The CMTS 12 will update its routing and ARP tables to reflect a CPE 18 IP 54 addresses and the CM 16 MAC 44 address pairing in the registration request. As was discussed above, the CMTS 12 records an IP 54 address obtained by the CPE 18 with DHCP 66 before sending a DHCPACK for the CPE 18 to the relay agent, the CM 16. The CMTS 12 will also generate an SNMP 64 trap if a CPE 18 IP 54 address in the registration request is paired with a different MAC 44 address for the CM 16 in the CMTS 12 tables.

If a data-over-cable system without telephony returned is being used, the CM 16 sends messages to the CMTS 12 on an upstream cable connection and receives messages from the CMTS 12 on a downstream cable channel. The CM 16 can also send data packets on an upstream cable connection to the CMTS 12, which forwards the data packets to the data network 28 via the CMTS-NSI 32. The CMTS 12 sends response data packets back to the CM 16 on a downstream cable channel.

If a data-over-cable system with telephony return is used, the CM 16 can send messages to the CMTS 12 on an upstream telephony connection via the PSTN 22 to the TRAC 24, which forwards the messages to the CMTS 12. The CM 16 can also send data packets on an upstream telephony connection via the PSTN 22 to the TRAC 24, which forwards the data packets to the data network 28. The CMTS 12 sends response data packets back to the CM 16 on a downstream cable channel.

After completing the registration request and registration response sequence, the CM 16 and/or the CPE 18 have completed initialization and can communicate with the data-over-cable system 10 and the data network 28 (FIG. 1). The CM 16 typically acts as a relay agent for requests and responses for one or more CPEs 18 attached to the CM 16.

Network Address Provisioning in a Network

If a network address server, such as a DHCP 66 server, is configured to serve hosts on a single network, (e.g., a LAN outside the data-over-cable system 10), it is typically setup with a single network address scope, a single network address pool and a single set of network address server options. For example, a DHCP 66 server on a single network (e.g., an Ethernet LAN) will typically receive DHCP 66 messages without the DHCP 66 giaddr-field 160 filled since no relay agents are used. However if a network address server, such as a DHCP 66 server, is to serve multiple network devices from multiple networks, multiple network address scopes, multiple network address pools, and multiple sets of network address server options have to be used to accommodate the multiple networks.

To accommodate multiple networks, network address "scopes" are created in the network address server. Each network address scope typically contains a "network identifier," comprising a network address and a "netmask." The network address server also includes a pool of network addresses, and a set of network address server options. When the network address server receives a message, it needs to determine which network the request is coming from in order to assign a requesting network device a network address and a set of attributes that make sense for that network.

To assign a network address for multiple networks, a network address in a network address network address message field (e.g., DHCP 66 giaddr-field 130) is typically used. A network address server looks at a network address in the network address message field in messages used to request a network address and matches this network address against a network address from the network address scopes that it has been assigned. When a match is found, the network address server sends a response addressed to the network address from the message either offering or acknowledging a network address from the network address pool defined for the network address scope and containing network address server options for that network address scope.

Multiple network address scopes can be used to create multiple virtual networks if a router has a method to distinguish which virtual network a network device wants to be. On a homogenous network with a single router, using multiple network address scopes would be nearly impossible, short of implementing complicated tables in a network address server which associate the hardware addresses of the network devices with appropriate virtual networks.

However, if a router can tell which virtual network a network device needs to be in, prior to that network device acquiring a network address, the router could direct a network address server to assign network addresses and network address server attributes appropriately to groups of network devices.

Network Address Provisioning in a Data-over-cable System

An IP 54 address space contains certain ranges of addresses that are reserved as private addresses. These private addresses are never assigned to any parties and are typically used on IP 54 networks that are isolated from a public IP 54 network like data network 28 (e.g., the Internet). Table 11 illustrates exemplary private IP 54 address range blocks defined by the Internet Assigned Numbers Authority ("IANA"). For more information on IANA, see the URL "www.iana.org." However, other private IP 54 address ranges many also be used.

TABLE 11

| | |
|---|---|
| 10.0.0.0 | // Private IP 54 address ranges |
| 172.16.0.0 | |
| 192.168.0.0 | |

It is desirable to assign a group of network devices (e.g., CMs 16) addresses from these private IP 54 address ranges in order to minimize a number of public IP 54 addresses that a data-over-cable system 10 needs to own and maintain (e.g., to allow large numbers of always-on cable modems). However, as was described above, only public IP 54 addresses are typically assigned using DHCP 66 in a data-over-cable system 10.

FIG. 14 is a flow diagram illustrating a Method 330 for network address provisioning in a data-over-cable system.

At Step 332, a private network address marker is selected for multiple first network devices on a second network device on a data-over-cable system. The private network address marker indicates private network addresses are to be used for the multiple first network devices. The private network addresses are not addressable outside of the data-over-cable system. At Step 334, a public network address marker is selected for multiple other network devices associated with the multiple first network devices. The public network address marker indicates that public network addresses are to be used for the multiple other network devices associated with the multiple first network devices. The public network addresses are addressable outside of the data-over-cable system. At Step 336, a private network address scope is set for the private network address marker on a network address server associated with the data-over-cable system. The private network address scope for the private address marker includes a first private network address and a netmask. At Step 338, a public network address scope is set for the public address maker on a network address server associated with the data-over-cable system. The public network address scope for the public address marker includes a first public network address and a netmask. At Step 340, the data-over-cable system is divided into a private virtual network and a public virtual network using private network address marker and the public network address marker, thereby reducing a number of public network addresses required by the data-over-cable system. The data-over-cable system may be divided into more than two virtual networks by selecting more than two network address markers, and setting more than two network address scopes on the network address server. Method 330 may allow large numbers of "always-on" cable modems to be used with other not always-on in a data-over-cable system with a limited pool of public network addresses. The "always-on" cable modems may be used for services such as Voice over Internet Protocol ("VoIP") that typically require instant access to a data-over-cable system.

In one preferred embodiment of the present invention, the multiple first network devices are CMs 16, the second network device is a CMTS 12, and one of the other network devices is the CPE 18. The private network address marker is a private IP 54 address and the public network address marker is a public IP 54 address. The private network address scope for the private network address includes a first private IP 54 address and an IP 54 netmask. The public network address scope for the public network address includes a first public IP 54 address and an IP 54 netmask. The network address server is a DHCP 66 server 160. However, the present invention is not limited to the network devices, network addresses, network address scopes, or network address server described, and other network addresses, network address scopes, or network address servers can also be used.

Table 12 illustrates an exemplary private network addresses marker, and an exemplary private network address scope. Table 12 also illustrates an exemplary public network address marker, and an exemplary public network address scope. However, the present invention is not limited to the exemplary network address markers or the exemplary network address scopes illustrated in Table 12 and other network address markers and network address scopes could also be used.

TABLE 12

| Network Address Marker | Network Address Scope (Network Address/netmask) |
|---|---|
| Private 10.1.1.1 | Private 10.1.1.0/255.255.255.0 |
| Public 149.112.8.1 | Public 149.112.8.0/255.255.255.0 |

As is illustrated in Table 12, an exemplary private address marker includes an IP 54 address of 10.1.1.1. The exemplary private network address scope includes an IP 54 address of 10.1.1.0 and a netmask of 255.255.255.0. The network address, 10.1.1.0, from the private network address scope, indicates a network identifier of "10" (also written as 10.0.0.0), which indicates a private network (e.g., see Table 11). This network address also indicates a first host identifier of "1.1.0."

In one preferred embodiment of the present invention, a private address marker is selected as a first private network address (e.g., 10.1.1.1) within a group of private network addresses defined by a private network address scope (e.g., 10.1.1.0). The public address marker can be selected in a similar way. However, the present invention is not limited to selecting the address markers as a first network address defined by the network address scope, and other network address markers with other netmask can also selected (e.g., a first IP 54 address of 10.1.1.12 for a private address marker, or 149.112.8.76 for a public address marker).

In one preferred embodiment of the present invention, a first private IP 54 address allocated within the private network address scope by a DCHP 66 server 160 will have a value of the private network address marker plus one, or 10.1.1.2, a second private IP 54 address, will have a value of 10.1.1.3, etc. Public network addresses are allocated in a similar manner (e.g., 149.112.8.2, 149.112.8.3, etc.). However, the present invention is limited to such a network address allocation, and other network address allocation schemes could also be used.

The netmask is used to separate network identifiers and determine if a network address marker and network address within a network address scope are on the same network. The netmask can also be used to eliminate certain network addresses from a network address range. As is known in the art, a network mask is applied to a network address with a boolean "AND" operation on a bit-by-bit basis (e.g., 0 AND 0=0, 0 AND 1=0, 1 AND 0=0, 1 AND 1=1). Table 13 illustrates applying the exemplary private network address scope netmask to the private network address marker of 10.1.1.1. Netmasks are applied to public network addresses using a public netmask in a similar way.

TABLE 13

| Address or netmask | Bit Pattern |
|---|---|
| 10.1.1.1 AND | 00001010 00000001 00000001 00000001 |
| 255.555.255.0 | 11111111 11111111 11111111 00000000 |
| Result = 10.1.1.0 | 00001010 00000001 00000001 00000000 |

The result from Table 13 is applied to a private network address from a private network address scope as is illustrated in Table 14. The result is applied to the private network address from the private network scope using a boolean eXclusive OR ("XOR") operation. As is known in the art, a boolean XOR is also applied on a bit-by-bit basis (e.g., 0 XOR 0=0, 0 XOR 1=1, 1 XOR 0=1, 1 XOR 1=0). If the result of the XOR operation is zero, a network address marker and a network address from a network address scope are on the same network (e.g., within a private address space for a private network).

TABLE 14

| Address | Bit Pattern |
| --- | --- |
| Result Table 12, 10.1.1.0 XOR | 00001010 00000001 00000001 00000000 |
| Private network address from scope 10.1.1.0 | 00001010 00000001 00000001 00000000 |
| Result = 0.0.0.0 | 00000000 00000000 00000000 00000000 |

Thus, the result of zero from Table 14 indicates the private network address marker 10.1.1.1 is within the private network address scope comprising the private network address 10.1.1.0 and the netmask 255.255.255.0.

In one preferred embodiment of the present invention, the private address marker is dynamically selected at Step 332 or the public address marker is dynamically selected at Step 334. In another preferred embodiment of the present invention, the private address marker is statically selected at Step 332 or the public address marker is statically selected at Step 334.

Table 15 illustrates an exemplary dynamic selection format for the private address marker and the public address marker. Dynamic selection of a private address marker or a public address maker may be used after a second network device, such as the CMTS 12, has already booted. However, other selection formats may also be used and the present invention is not limited to the exemplary dynamic selection commands or command format illustrated in Table 15.

Line 1 and Line 2 indicate that the public and private networks should use a MCNS RF interface 40 using QAM modulation. However, other modulations can also be used.

In one exemplary preferred embodiment of the present invention, the command at Line 3 of Table 15 can be used to set a DCHP 66 server associated with the data-over-cable system 10 (e.g., DHCP 66 server 130), with a private network address scope (e.g.,10.1.1.0/255.255.255.0) and a public network address scope (e.g., 149.112.8.0/255.255.255.0) at Steps 336 and 338 of Method 330. However, other commands may also be used to set a network address server with a network address scope.

In one exemplary preferred embodiment of the present invention, using the command at Line 4 of Table 15, the data-over-cable system 10 is divided into a private virtual network and a public virtual network using the private network address marker and the public network address marker at Step 340. Line 4 of Table 15 indicates to the second network device to set the DHCP 66 giaddr-field 130 for any DHCP 66 messages from CMs 16 with the private network address marker (e.g., set DHCP cmgiaddr cmnet). Line 4 of Table 15 also indicates to the second network device to set the DHCP giaddr-field 130 for any DCHP 66 messages for other network devices associated with the CMs 16 (e.g., CPEs 18) with the public address marker (e.g., set DHCP cpegiaddr cpenet).

The DHCP 66 server 160 will use the network address marker in the DHCP 66 giaddr-field 130 to allocate an appropriate private or public network address for a network

TABLE 15

1. add ip net cmnet address 10.1.1.1/24 frame mcns interface qam // select private network addr
2. add ip net cpenet address 149.112.8.1/24 frame mcns interface qam // select public network addr
3. set scope DHCP server cmnet 10.1.1.0/255.255.255.0 cpenet 149.112.8.0/255.255.255.0
   //set network address scope for private and public parts in DHCP 66 server 160
4. set DHCP cmgiaddr cmnet cpegiaddr cpenet // divide data-over-cable system into public and
   // private parts In one exemplary preferred embodiment of the present invention, the exemplary commands listed in Table 15 can be dynamically executed (e.g., from a software application such as CMTS 12 manager, a SNMP 64 manager or input manually by a user on a CMTS 12 user interface) on the CMTS 12 to select a private or a public network address marker. For example, Line 1 in Table 15 can be used at Step 332 to select a private network address marker for the CMs 16 on the data-over-cable system 10. CMs 16 with a private network address marker will form a private virtual cable modem network (e.g., "cmnet") using a private network address marker of "10.1.1.1/24." The private address marker indicates that an IP 54 address with the prefix "10.1.1" in the first 24-bits of an IP 54 address (e.g., a 32-bit IP 54 address) defines a private IP 54 address space and the private address marker will be 10.1.1.1.

In one exemplary preferred embodiment of the present invention, Line 2 in Table 15 can be used at Step 334 to select a public network address marker for network devices, such as CPEs 18, associated with the CMs 16. Network devices with a public network address marker will form a public virtual "cpe" network (e.g., "cpenet") using a public network address marker of "149.112.8.1/24." The public address marker indicates that an IP 54 address with the prefix "149.112.8" in the first 24-bits of an IP 54 address (e.g., a 32-bit IP 54 address) defines a public IP 54 address space and the public network address marker will be 149.112.8.1. The remainder of the exemplary commands on device. Since private IP 54 addresses are used for CMs 16, and public IP 54 addresses are used for other network devices associated with the CMs 16, a total number of available public IP 54 addresses required by a data-over-cable system may be reduced using Method 330. Thus, method 330 may allow a larger number of "always-on" CMs 16 to be used in the data-over-cable system 10 with a large number of not "always-on" CMs 16.

In another embodiment of the present invention, the network address markers or the network address scopes, or virtual networks may be statically selected. In such an embodiment, a network address for desired network address marker, or a network address scope or a virtual network may be indicated in a configuration file for the second network device. The second network device, such as the CMTS 12, may use the network address markers or network address scope from the configuration file to statically assign the network address markers or the network address mark scopes when the second network device is booted or re-booted using commands similar to those illustrated in Table 12.

Using Network Address Provisioning in a Data-over-cable System

As was described above, CMs 16, CPEs 18 and other network devices on a data-over-cable system 10 obtain their IP 54 addresses using DHCP 66 (e.g., see FIGS. 10 or 13). The IP 54 addresses are obtained using DHCP 66 on a data-over-cable system with telephony return using an upstream telephony return connection, and on a data-over-cable system without telephony return using an upstream cable connection.

In a typical DHCP 66 implementation for a network other than the data-over-cable system 10, an IP 54 address that a relay agent typically inserts into a DCHP 66 giaddr-field 130 is an IP 54 address of an interface on which the relay agent received a DHCP 66 message. In cases where the interface on which the message was received has more than one IP 54 address, the relay agent is allowed to choice an appropriate IP 54 address. However, as was discussed above, a typical DHCP 66 implementation does not typically work in the data-over-cable system 10.

In one exemplary preferred embodiment of the present invention, the CMTS 12 in a data-over-cable system 10, typically acts as both a router and a relay agent for other network devices (e.g., the CM 16 or the CPE 18) on the cable network 14. The CMTS 12 acts as a relay agent because DHCP 66 is a LAN protocol and makes use of broadcast messages. Since routers do not forward broadcast messages, routers need to actually receive these messages and re-send them to their intended networks.

As a router and a relay agent, the CMTS 12 listens for DHCP 66 transactions from one or more of its interfaces (e.g., a TRAC 24 interface or an upstream cable channel interface) and relays the DHCP 66 transactions to one or more of its other interfaces (e.g., the DHCP 66 server 160 interface, or a downstream cable channel). In preferred embodiments of the present invention, when sending DHCP 66 messages, the CMTS 12 typically inserts its own IP 54 address into the DHCP 66 message so that the DHCP servers 160 can send the response directly to the relay agent (i.e., the CMTS 12). Otherwise, a DHCP 66 response would be broadcast on a network (e.g., to the cable network 14). In preferred embodiments of the present invention, the DHCP 66 giaddr-field 130 is where the CMTS 12 inserts its own IP 54 address.

In one preferred embodiment of the present invention, if private and public network address markers are selected as was described for Method 330, a relay agent (e.g., CMTS 12) in a data-over-cable system 10 will not insert a network address of the relay agent into a DCHP 66 giaddr-field 130 but insert a network address marker instead. Using a private network address marker or a public network address marker in the DHCP 66 giaddr-field 130 instead of an IP 54 address of the relay agent, allows provisioning a data-over-cable system into a private virtual network and a public virtual network, thus reducing a total number of public network addresses required on the data-over-cable system.

FIG. 15 is a flow diagram illustrating a Method 342 for using network address provisioning in a data-over-cable system. At Step 344, a first message is received with a first configuration protocol from a network device on a second network device. The first message is used to request a network address for the network device on the data-over-cable system. A test is conducted by the second network device at Step 346 to determine if the network device should receive a private network address using a network address table associated with the second network device. If the network device should not receive a private network address, a first network address field is set in the first message with a private network address marker at Step 348. A private address marker is used by a network address server to allocate a private network address for a private virtual network on the data-over-cable system. If the network device should receive a public network address, a first network address field is set in the first message with a public network address at Step 350. A public address marker is used by a network address server to allocate a public network address for a virtual public network of the data-over-cable system.

The first message is forwarded to a network address server associated with the data-over-cable system at Step 352. The network address server uses the first network address field to allocate either a private network address or a public network address for the network device on the data-over-cable system.

In one preferred embodiment of the present invention, the first network device is a CM 16, the second network device is a CMTS 12. The private network address marker is a private IP 54 address (e.g., from Table 10). The first message is a DCHP 66 message (e.g., a DHCPDISOVER, DHCPREQUST), the first network address field is a DHCP 66 giaddr-field 130, and the network address server is a DHCP 66 server 160. However, the present invention is not limited to the network devices, network addresses, or network address servers described, and other network devices (e.g., CPE 18), network addresses or network address servers can also be used.

In one exemplary preferred embodiment of the present invention, it is determined that CMs 16 should be allocated a private network address on the data-over-cable system 10 and other network devices associated with CMs 16 (e.g., CPEs 18) should be allocated public network adddreses. However, the present invention is not limited to allocating private network addresses to CMs 16 and public network addresses to CPEs 18 and other private/public network address allocation schemes could also be used.

As was discussed above, the CM 16 sends and receives MAC 44 messages in order to establish MAC 44 connectivity. When a CM 16 first initializes on the data-over-cable system, the CMTS 12 receives MAC 44 messages before any higher layer messages (e.g., IP 54 messages or DHCP 66 messages) from the CM 16. Prior to the arrival of any DHCP 66 messages at the CMTS 12, MAC messages 44 are received including a MAC 44 address of an initializing CM 16.

The CMTS 12 records a MAC 44 address as belonging to a CM 16 in one or more routing tables including an ARP table. In one preferred embodiment of the present invention, the network address table of Method 342 includes a traditional ARP table that has been extended to include additional fields, one of which is a "host type-field."

Table 16 illustrates an exemplary extended ARP table layout. However, other extended ARP table layouts can also be used and the present invention is not limited to the extended ARP table layout in Table 16. MAC 44 addresses for the CMs 16 are placed into the extended ARP table during initialization and the host type-field is populated as "CM." The host-type field may or may not be populated Table 16 for a CPE 18. The IP 54 address field in Table 16 is empty. The IP 54 address field is filed with a private or public network address via DHCP 66 as will be described below.

TABLE 16

| MAC 44 Address | IP 54 Address | Host-type |
| --- | --- | --- |
| 00-A0-24-15-d8-82 | — | CM |
| 00-A0-24-15-11-25 | — | CM |

If the CM successfully establishes MAC 44 connectivity, it sends a DHCP 66 message (e.g., DHCPDISCOVER, DHCPREQUEST) upstream, either on an upstream telephony return connection, or an upstream cable connection to request an IP 54 address for use on the data-over-cable system 10.

In one exemplary preferred embodiment of the present invention, at Step 346 of Method 342, the CMTS 12 does a lookup on a MAC 44 address in the extended ARP table to determine if a network device sending the DHCP 66 message should be allocated a private network address on the data-over-cable system 10. In one exemplary preferred embodiment of the present invention, the CMTS 12 determines that a DHCP 66 message has been sent from a CM 16 using the host type-field from the extended ARP table using a table entry including a MAC 44 address from a MAC 44 message matched to a MAC 44 address for the CM 16.

At Step 348 of Method 342, a private network address marker (e.g., Table 12) is used to set the DHCP 66 giaddr-field 130 in the DCHP 66 message (e.g., a DCHPDISCOVER, DHCPREQUEST) as the CMTS 12, acting as a relay agent, prepares to relay the DHCP 66 message. When a DHCP 66 message arrives from a CPE 18, a MAC 44 address lookup in the extended ARP table reveals that the network device is not a CM 16 at Step 346 of Method 342. The CMTS 12 uses a public network address marker to set the DCHP 66 giaddr-field 130 in the DCHP message 66 at Step 350 of Method 342 for the CPE 18. Since a DHCP 66 message coming upstream from a CPE 18 is forwarded by an associated CM 16, the CMTS 12 can determine which CM 16 a CPE 18 is associated with and can use this information to reject packets from CPEs 18 associated with unregistered CMs 16. The DHCP 66 message with the DHCP 66 giaddr-field 130 set with an appropriate network address marker, is forwarded at Step 352 of Method 342 to the DHCP 66 server 160.

Providing Provisioned Network Addresses in a Data-over-cable System

When a network address server receives the first message with a first network address field set with an appropriate network address marker, the network address server determines whether to allocate a private network address or a public network address for the network device that sent the first message.

Figure 16B:
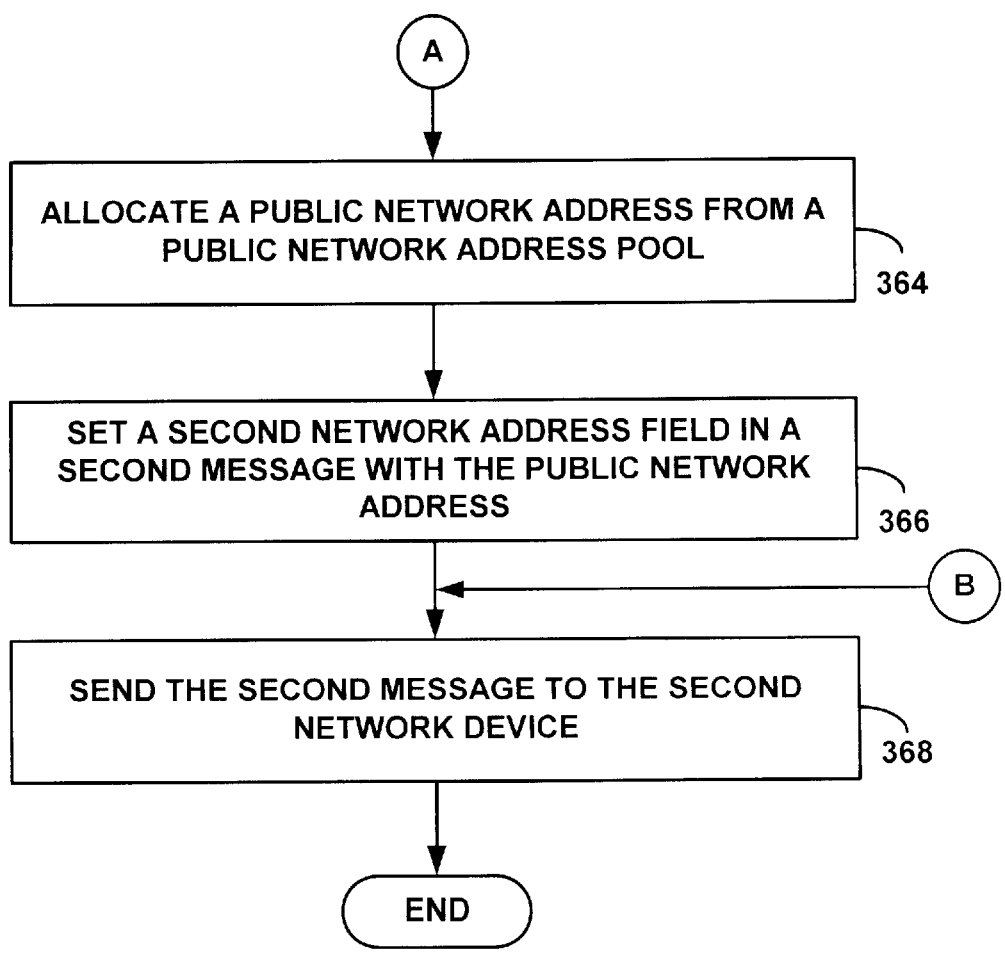

FIGS. 16A and 16B are a flow diagram illustrating a Method 354 allocation of provisioned network addresses in a data-over-cable system. At Step 356 of FIG. 16A, a first message with a first configuration protocol is received on a network address server from a second network device to request a network address for a network device on the data-over-cable system. At Step 358, a test is conducted to determine whether the network device is to receive a private network address on the data-over-cable system by comparing a network address marker in a first network address field in the first message with a network address from multiple network address scopes associated with the network address server. In another embodiment of the present invention, the test at Step 358 is conducted to determine whether the network device is to receive a public network address. If the network device is to receive a private network address, a private network address from a private address pool is allocated at Step 360. The private network address is not addressable outside of the data-over-cable system. At Step 362, a second network address field in a second message is set with the private network address.

If the network device is not to receive a private network address with the test at Step 358 of FIG. 16A, a public network address from a public network address pool is allocated at Step 364 of FIG. 16B. The public network address is addressable outside of the data-over-cable system. At Step 366, a second network address field is set in second message with the public network address. At Step 368, the second message is sent to the second network device. The second network device forwards the second message back to the network device. The network device uses a network address in the second network address field in the second message for identification.

In one preferred embodiment of the present invention, the network address server is a DHCP 66 server 160, the first message is a DCHP 66 message (e.g., DHCPDISCOVER, DHCPREQUEST), the first network address field is a DCHP 66 giaddr-field 130, the second message is a DCHP 66 message (e.g., DHCPOFFER, DHCPACK) and the second network address field is a DHCP 66 yiaddr-field 126. The private network address marker is a private IP 54 address, the private network address is a private IP 54 address, and the public network address is a public IP 54 address. The network device is a CM 16 or a CPE 18, and the second network device is a CMTS 12. However, the present invention is not limited to the exemplary specific network address server, messages, network address fields, network address markers, private network addresses, public network addresses, or network devices, described, and other network address server, messages, network address fields, network address markers, private network addresses, public network addresses, and network devices can also be used.

In one exemplary preferred embodiment of the present invention, the test at Step 358 of FIG. 16A, compares a network address marker (e.g., private or public) in a DCHP 66 giaddr-field 130 in a DHCP 66 message with a network address from multiple network address scopes associated with the DHCP 66 server 160 (e.g., Table 12). The test at Step 358 includes applying the netmask from a network addresses scope to the network address marker and comparing the result to a network address in the network address scope (e.g., Tables 13 and 14). The result of the test at Step 358, allows a private network address or a public network address to be assigned by the network address server.

If the network device is to receive a private network address, a private network address from a private address pool is allocated at Step 360. The private network address is not addressable outside of the data-over-cable system. In one preferred embodiment of the present invention, a first private address allocated from a private address pool is a network address used for the private network address marker plus one. For example, if the private network address marker is 10.1.1.1, a first private network address allocated from the private address pool is 10.1.1.2, a second private network address allocated from the private network address pool is 10.1.1.3, etc. Public network addresses are allocated in a similar manner from a public network address pool. However, the present invention is not limited to this network address allocation and other network address allocation scheme can also be used.

Figure 17:
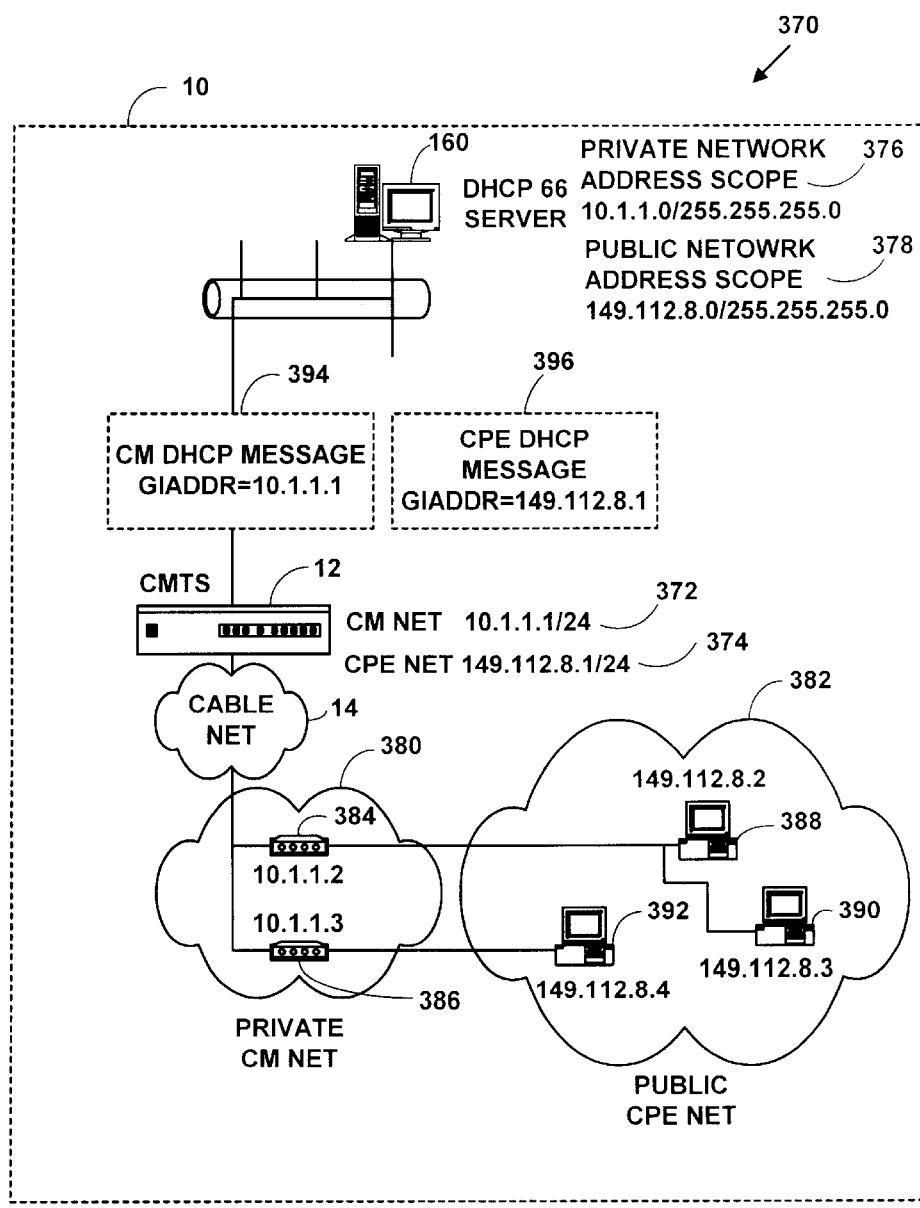
FIG. 17 is block diagram visually illustrating network address provisioning in a data-over-cable system.

FIG. 17 is a block diagram visually illustrating network address provisioning 370 in a data-over-cable system 10. Method 330 (FIG. 14) is used to select a private network address marker 372 (e.g., at Step 332) and a public network address marker 374 (e.g., at Step 334) on the CMTS 12. A private network address scope 376 is set (e.g., at Step 336) and a public network address scope 378 (e.g., at Step 338) is set on a network address server, such as the DHCP 66 server 130 associated with the data-over-cable system 10. The data-over-cable system 10 is divided into a private virtual network 380 and a public virtual network 382 (e.g. at Step 340).

Method 342 (FIG. 15) is a method for using network address provisioning. At Step 344, a first message is received on a second network device, such as the CMTS 12 (FIG. 17), with a first configuration protocol from a network device. The first message is used to request a network address for a network device 384, 386, 388, 390, 392 (FIG. 17) on the data-over-cable system 10. A test is conducted by the second network device at Step 346 to determine if the network device should receive a private network address using a network address table (e.g., an extended ARP table) associated with the second network device. If the network device should receive a private network address, a first network address field is set in a first message 394 with a private network address marker at Step 348. A private address marker is used by a network address server to allocate a private network address for a private virtual network part of the data-over-cable system. If the network device should not receive a private network address, a first network address field is set in a first message 396 with a public network address at Step 350. A public network address marker is used by a network address server to allocate a public network address for a virtual public network part of the data-over-cable system. The first message 394 or 396 is forwarded to a network address server, such as the DCHP 66 server 160 associated with the data-over-cable system 10 at Step 352.

Method 354 (FIG. 16) is used for allocation of provisioned network addresses in a data-over-cable system 10. At Step 356 of FIG. 16A, a first message 394 or 396 (e.g., DHCPDISCOVER, DHCPREQUST) with a first configuration protocol (e.g., DHCP 66) is received on a network address server, such as the DCHP 66 server 160, from a second network device, such as the CMTS 12, to request a network address for a network device 384, 386, 388, 390, 392 on the data-over-cable system 10. At Step 358, a test is conducted to determine whether the network device is to receive a private network address on the data-over-cable system by comparing a network address marker (e.g., 10.1.1.1) in a first network address field (e.g., the DHCP 66 giaddr-field 130) in the first message 394 or 396 with a network address (e.g., 10.1.1.0) from multiple network address scopes 376 or 378 associated with the network address server. If the network device is to receive a private network address, a private network address from a private address pool is allocated at Step 360 (e.g., 10.1.1.2). The private network address is not addressable outside of the data-over-cable system 10. At Step 362, a second network address field (e.g., a DHCP 66 yiaddr-field 126) in a second message (e.g., DHCPOFFER, DHCPACK) is set with the private network address (e.g., 10.1.1.2).

If the network device is not to receive a private network address with the test at Step 358, a public network address from a public network address pool is allocated at Step 364 of FIG. 16B (e.g., 149.112.8.2). The public network address is addressable outside of the data-over-cable system 10. At Step 366, a second network address field (e.g., a DHCP 66 yiaddr-field 126) is set in a second message (e.g., DHCPOFFER, DHCPACK) with the public network address (e.g., 149.112.8.2). At Step 368, the second message is sent to the second network device, such as the CMTS 12. The second network device forwards the second message back to the network device. The network device uses a network address in the second network address field in the second message for identification.

FIG. 17 illustrates a first private IP 54 address of 10.1.1.2 assigned to a first CM 384, and a second private IP 54 address of 10.1.1.3 assigned to a second CM 386. A first CPE 388 associated with the first CM 384 is assigned a first public address of 149.112.8.2, and a second CPE 390 associated with the first CM 384 is assigned a second public network address of 149.112.8.3. A third CPE 392 associated with the second CM 386 is assigned a third public address of 149.112.8.4. The two private network addresses are used on the private virtual "cm" network 380 and the three public network addresses are used on the public virtual "cpe" network 382. FIG. 17 is exemplary only and the present invention is not limited to the network addresses and network components illustrated in FIG. 17. FIG. 17 is illustrated with an two-way (i.e., upstream and downstream) cable connection. However, an upstream telephony connection (via the PSTN 22 and the TRAC 24, and is not illustrated in FIG. 17.) with a downstream cable connection can also be used with preferred embodiments of the present invention to provide provisioning of network addresses in a data-over-cable system 10.

Methods for preferred embodiments of the present invention are described primarily with private network addresses allocated to CMs 16 and public network addresses allocated to CPEs 18. However, in other embodiments of the present invention, private network addresses may be allocated to CPEs 18 and public network addresses may be allocated to CMs 16. In addition, other network devices, such facsimile machines, printers, etc. may also be associated with the CMs 16 and receive either public or private network devices.

Methods for preferred embodiments of the present invention, may allow the data-over-cable system 10 to be split into a private virtual network and public virtual network (or additional virtual networks), thereby reducing a number of public network addresses required by the data-over-cable system . More than two virtual network can be created by using more than two network address markers. The methods of preferred embodiments of the present invention requires no special logic in the DHCP 66 server 160 since DHCP 66 servers already use network address scopes, and it is a common configuration practice to set network addresses scopes on a DHCP 66 server. The DHCP 66 logic in the CMs 16 or in the CPEs 18 attached to the CMs 16 also does not have to be modified. In exemplary preferred embodiments of the present invention, the CMTS 12 is the only network device on the data-over-cable system 10 that requires modifications. However, the methods for preferred embodiments of the present invention may also be implemented in other network devices besides the CMTS 12.

The provisioning of network addresses allows two or more virtual networks to be created on the data-over-cable system. The provisioning of network addresses may also reduce a number of public addresses required for a data-over-cable system (e.g., for "always-on" cable modems).

It should be understood that the programs, processes, methods, systems and apparatus described herein are not related or limited to any particular type of computer apparatus (hardware or software), unless indicated otherwise. Various types of general purpose or specialized computer apparatus may be used with or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, the Steps of the flow diagrams may be taken in sequences other than those described, and more or fewer elements or components may be used in the block diagrams. In addition, the present invention can be practiced with software, hardware, or a combination thereof.

The claims should not be read as limited to the described order or elements unless stated to that effect. Therefore, all embodiments that come within the scope and spirit of the following claims and equivalents thereto are claimed as the invention.

We claim:

1. In a data system with a plurality of network devices, a method for using network address provisioning, comprising the following steps:

receiving a first message with a first configuration protocol on a second network device from a network device to request a network address for the network device on the data system;

determining whether the network device is to receive a private network address on the data system with a network address table associated with the second network device, and if so, obtaining a private network address marker on the second network device, wherein the private network address marker indicates that a private network address is to be selected for the network device, and wherein the private network address is not addressable outside of the data system, and setting a first network address field in the first message with the private network address marker;

and if the network device is not to receive the private network address, obtaining a public network address marker on the second network device, wherein the public network address marker indicates that a public network address is to be selected for the network device, and wherein the public network address is addressable outside of the data system, and setting the first network address field in the first message with the public network address marker; and forwarding the first message to a network address server associated with the data system, wherein the first network address field in the first message is used by the network address server to allocate a network address on the data system.

2. computer readable medium having stored therein instructions for causing a central processing unit to execute the method of claim 1.

3. The method of claim 1 wherein the network device is any of a cable modem or customer premise equipment.

4. The method of claim 1 wherein the second network device is a cable modem termination system.

5. The method of claim 1 wherein the private network address marker is a private Internet Protocol address and the public network address marker is a public Internet Protocol address.

6. The method of claim 1 wherein the first message is a Dynamic Host Configuration Protocol message and the first network address field in the first message is a Dynamic Host Configuration Protocol message giaddr-field.

7. The method of claim 1 wherein the network address table associated with the second network device is an extended Address Resolution Protocol address table.

8. The method of claim 1, wherein (i) the network device is any of a cable modem or customer premise equipment and (ii) the second network device is a cable modem termination system.

9. The method of claim 1, wherein the step of obtaining a private network address marker includes dynamically obtaining the private network address marker.

10. The method of claim 1, wherein the step of obtaining a public network address marker includes dynamically obtaining the public network address marker.

11. The method of claim 1, wherein the step of obtaining a private network address marker includes statistically obtaining the private network address marker with a configuration file used to configure the second network device.

12. The method of claim 1, wherein the step of obtaining a public network address marker includes statistically obtaining the public network address marker with a configuration file used to configure the second network device.

13. The method of claim 1, wherein the network address marker is an Internet protocol address.

14. In a data system with a plurality of network devices, a method for providing network addresses from multiple address pools, comprising the following steps:

receiving a first message with a first configuration protocol on a network address server from a second network device to request a network address for a network device on the data system;

determining whether the network device is to receive a private network address on the data system by comparing a network address marker in a first network address field in the first message with a plurality of network addresses from a plurality of network address scopes associated with the network address server, and if the network device is to receive the private network address, allocating the private network address from a private network address pool, wherein the private network address is not addressable outside of the data system, and setting a second network address field in a second message for the first configuration protocol with the private network address;

and if the network device is not to receive the private network address, allocating a public network address from a public network address pool, wherein the public network address is addressable outside of the data system, and setting the second network address field in the second message for the first configuration protocol with the public network address; and sending the second message to the second network device, wherein the second network device forwards the second message back to the network device, and wherein the network device uses a network address in the second network address field in the second message for identification.

15. A computer readable medium having stored therein instructions for causing a central processing unit to execute the method of claim 14.

16. The method of claim 14 wherein the network device is any of a cable modem or customer premise equipment.

17. The method of claim 14 wherein the second network device is a cable modem termination system.

18. The method of claim 14 wherein the private network address is a private Internet Protocol address.

19. The method of claim 14 wherein public network address is a public Internet Protocol address.

20. The method of claim 14 wherein the network address server is a Dynamic Host Configuration Protocol server.

21. The method of claim 14 wherein the network address marker is an Internet Protocol address.

22. The method of claim 14 wherein the second message is a Dynamic Host Configuration Protocol message and the second network address field is a Dynamic Host Configuration Protocol message yiaddr-field.

23. The method of claim 14 wherein the first message is a Dynamic Host Configuration Protocol message and the first network address field is a Dynamic Host Configuration Protocol message giaddr-field.

24. The method of claim 14 wherein a network address scope comprises an Internet Protocol address and an Internet Protocol netmask.

25. The method of claim 14, wherein (i) the network device is any of a cable modem or customer premise equipment and (ii) the second network device is a cable modem termination system.

26. The method of claim 14 wherein the private network address marker is a private Internet Protocol address and the public network address marker is a public Internet protocol address.

27. The method of claim 14, wherein the step of allocating a private network address marker includes dynamically allocating the private network address marker.

28. The method of claim 14, wherein the step of allocating a public network address marker includes dynamically allocating the public network address marker.

29. The method of claim 14, wherein the step of allocating a private network address marker includes statistically allocating the private network address marker with a configuration file used to configure the second network device.

30. The method of claim 14, wherein the step of allocating a public network address marker includes statistically allocating the public network address marker with a configuration file used to configure the second network device.

31. In a data-over-cable system with a plurality of network devices, a method for using network address provisioning, comprising the following steps:

receiving a Dynamic Host Configuration Protocol message on a cable modem termination system from a network device to request an Internet Protocol address for the network device on the data-over-cable system;

determining whether the network device is to receive a private Internet Protocol address on the data-over-cable system with an extended Address Resolution Protocol table associated with the cable modem termination system, and if so, obtaining a private Internet Protocol address marker on the cable modem termination system, wherein the private Internet Protocol address marker indicates that the private Internet Protocol address is to be selected for the network device, and wherein the private Internet Protocol address is not addressable-outside of the data-over-cable system, and setting a Dynamic Host Configuration Protocol giaddr-field in the Dynamic Host Configuration Protocol message with the private Internet Protocol address marker;

and if the network device is not to receive the private Internet Protocol address, obtaining a public Internet Protocol address marker on the cable modem termination system, wherein the public Internet Protocol address marker indicates that a public Internet Protocol address is to be selected for the network device, and wherein the public Internet Protocol address is addressable outside of the data-over-cable system, and setting the Dynamic Host Configuration Protocol giaddr-field in the Dynamic Host Configuration Protocol message with the public Internet Protocol address marker; and forwarding the Dynamic Host Configuration Protocol message to a Dynamic Host Configuration Protocol server associated with the data-over-cable system, wherein the Dynamic Host Configuration Protocol giaddr-field in the Dynamic Host Configuration protocol message field of the first message is used by the Dynamic Host Configuration Protocol server to allocate the Internet Protocol address on the data-over-cable system.

32. A computer readable medium having stored therein instructions for causing a central processing unit to execute the method of claim 31.

33. The method of claim 31, wherein the network device is any of a cable modem or customer premise equipment.

34. The method of claim 31, wherein the step of obtaining a private Internet Protocol network address marker includes dynamically obtaining the private Internet Protocol network address marker.

35. The method of claim 31, wherein the step of obtaining a public Internet Protocol network address marker includes dynamically obtaining the public Internet Protocol network address marker.

36. The method of claim 31, wherein the step of obtaining a private Internet Protocol network address marker includes statistically obtaining the private Internet Protocol network address marker with a configuration file used to configure the second network device.

37. The method of claim 31, wherein the step of obtaining a public Internet Protocol network address marker includes statistically obtaining the public Internet Protocol network address marker with a configuration file used to configure the second network device.

38. In a data-over-cable system with a plurality of network devices, a method for providing network addresses from multiple address pools, comprising the following steps:

receiving a first Dynamic Host Configuration Protocol message on a Dynamic Host Configuration Protocol server from a cable modem termination system to request an Internet Protocol address for a network device on the data-over-cable system;

determining whether the network device is to receive a private Internet Protocol address on the data-over-cable system by comparing an Internet Protocol address marker in a Dynamic Host Configuration Protocol giaddr-field in the first Dynamic Host Configuration Protocol message with a plurality of Internet Protocol addresses from a plurality of Internet Protocol address scopes associated with the Dynamic Host Configuration Protocol server, and if the network device is to receive the private Internet Protocol address, allocating the private Internet Protocol address from a private Internet Protocol address pool, wherein the private Internet Protocol address is not addressable outside of the data-over-cable system, and setting a Dynamic Host Configuration Protocol yiaddr-field in a second Dynamic Host Configuration Protocol message with the private Internet Protocol address;

and if the network device is not to receive the private Internet Protocol address, allocating a public Internet Protocol address from a public Internet Protocol address pool, wherein the public Internet Protocol address is addressable outside of the system, and setting the Dynamic Host Configuration Protocol yiaddr-field in the second Dynamic Host Configuration Protocol message with the public Internet Protocol address; and sending the second Dynamic Host Configuration Protocol message to the cable modem termination system, wherein the cable modem termination system forwards the second Dynamic Host Configuration Protocol message back to the network device, and wherein the network device uses an Internet Protocol address in the Dynamic Host Configuration Protocol yiaddr-field in the second Dynamic Host Configuration Protocol message for identification.

39. A computer readable medium having stored therein instructions for causing a central processing unit to execute the method of claim 38.

40. The method of claim 38 wherein the network device is any of a cable modem or customer premise equipment.

41. The method of claim 38, wherein the step of allocating a private Internet Protocol network address includes dynamically allocating the private Internet Protocol network address.

42. The method of claim 38, wherein the step of allocating a public Internet Protocol network address includes dynamically allocating the public Internet Protocol network address.

43. The method of claim 38, wherein the step of allocating a private Internet Protocol network address includes statistically allocating the private Internet Protocol network address with a configuration file used to configure the second network device.

44. The method of claim 38, wherein the step of allocating a public Internet Protocol network address includes statistically allocating the public Internet Protocol network address with a configuration file used to configure the second network device.

* * * * *